US012004047B2

(12) United States Patent
Vassilovski et al.

(10) Patent No.: US 12,004,047 B2
(45) Date of Patent: Jun. 4, 2024

(54) ROADSIDE USER ALERT TECHNIQUES BASED ON LOCATION ACCURACY

(71) Applicant: QUALCOMM Incorporated, San Diego, CA (US)

(72) Inventors: Dan Vassilovski, Del Mar, CA (US); Gene Wesley Marsh, San Diego, CA (US); Anantharaman Balasubramanian, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 17/545,346

(22) Filed: Dec. 8, 2021

(65) Prior Publication Data

US 2023/0179954 A1 Jun. 8, 2023

(51) Int. Cl.
*H04W 4/029* (2018.01)
*G08G 1/16* (2006.01)
*H04W 4/06* (2009.01)
*H04W 72/51* (2023.01)

(52) U.S. Cl.
CPC ............ *H04W 4/029* (2018.02); *G08G 1/166* (2013.01); *H04W 4/06* (2013.01); *H04W 72/51* (2023.01)

(58) Field of Classification Search
None
See application file for complete search history.

(56) References Cited

U.S. PATENT DOCUMENTS

| 2019/0268726 | A1 | 8/2019 | Jiang et al. |
| 2021/0158701 | A1* | 5/2021 | Cho ............... G08G 1/096716 |
| 2023/0156440 | A1 | 5/2023 | Kong et al. |
| 2023/0168386 | A1 | 6/2023 | Hwang et al. |
| 2023/0169853 | A1 | 6/2023 | Le Houerou et al. |

FOREIGN PATENT DOCUMENTS

| WO | WO-2020052243 A1 | 3/2020 |
| WO | WO-2021141404 A1 * | 7/2021 |

OTHER PUBLICATIONS

International Search Report and Written Opinion—PCT/US2022/079826—ISA/EPO—dated Mar. 6, 2023.

* cited by examiner

*Primary Examiner* — Adolf Dsouza
(74) *Attorney, Agent, or Firm* — Dalei Dong; Holland & Hart LLP

(57) ABSTRACT

Methods, systems, and devices for wireless communications are described in which a vulnerable road user (VRU) user equipment (UE) indicates to a user whether a current position accuracy is sufficient or insufficient for approaching vehicles to determine if they present a hazard to the VRU. The position accuracy may be based on an accuracy threshold that is configured at the UE, such as by a serving base station or a road side unit (RSU). The accuracy threshold may be configured via common or dedicated signaling, through application-layer signaling, or may be pre-configured in the UE. When the VRU UE position accuracy exceeds the specified threshold for a particular interval of time, the UE may inform the user that approaching vehicles will be unable to determine their location with enough accuracy to take evasive maneuvers.

30 Claims, 18 Drawing Sheets

ROADSIDE USER ALERT TECHNIQUES BASED ON LOCATION ACCURACY

FIELD OF TECHNOLOGY

The following relates to wireless communications, including roadside user alert techniques based on location accuracy.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, UEs may transmit and receive safety messages, which may alert other UEs (e.g., vehicles) to the presence of vulnerable road users (VRUs). In vehicle-to-everything (V2X) networks, a UE carried by a VRU may transmit safety messages (e.g., that may be unicast, broadcast, groupcast, or multicast). In some cases, examples of safety messages transmitted by a UE may include personal safety messages (PSMs), vulnerable road user awareness messages (VAMs), basic safety messages (BSMs), co-operative awareness messages (CAMs), decentralized environmental notification messages (DENMs), application-layer messages, or other message types. The safety messages may include information related to a location of the UE, a motion state of the UE, a path history of the UE, path prediction of the UE, or a combination thereof. Vehicles within the V2X network may receive safety messages from nearby UEs and determine to perform one or more actions that may improve safety. Such actions by vehicles within the V2X network rely in relatively accurate positioning information from the UE associated with the VRU.

SUMMARY

The described techniques relate to improved methods, systems, devices, and apparatuses that support roadside user alert techniques based on position accuracy. In accordance with various aspects, the described techniques provide for a vulnerable road user (VRU) user equipment (UE) that indicates to the user whether a current position accuracy is sufficient or insufficient for approaching vehicles to determine if they present a hazard to the VRU. The position accuracy may be based on an accuracy threshold that is configured at the UE, such as by a serving base station or a road side unit (RSU). The accuracy threshold may be configured via common or dedicated signaling, through application-layer signaling, or may be pre-configured in the UE. The threshold may be based on historical data collected by the UE associated with a particular VRU path, for example. When the VRU UE position accuracy exceeds the specified threshold for a particular interval of time, the UE may inform the user that approaching vehicles will be unable to determine their location with enough accuracy to take evasive maneuvers. Thus, the VRU is provided with information related to the ability of vehicles to perform evasive maneuvers, and allows the VRU to proceed with greater caution.

A method for wireless communication at a user equipment (UE) is described. The method may include identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE, generating an alert at the UE that indicates the current position accuracy of the UE is above the position accuracy threshold value, and broadcasting a message to the one or more receivers that indicates the current position of the UE.

An apparatus for wireless communication at a UE is described. The apparatus may include a processor, memory coupled with the processor, and instructions stored in the memory. The instructions may be executable by the processor to cause the apparatus to identify a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE, generate an alert at the UE that indicates the current position accuracy of the UE is above the position accuracy threshold value, and broadcast a message to the one or more receivers that indicates the current position of the UE.

Another apparatus for wireless communication at a UE is described. The apparatus may include means for identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE, means for generating an alert at the UE that indicates the current position accuracy of the UE is above the position accuracy threshold value, and means for broadcasting a message to the one or more receivers that indicates the current position of the UE.

A non-transitory computer-readable medium storing code for wireless communication at a UE is described. The code may include instructions executable by a processor to identify a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE, generate an alert at the UE that indicates the current position accuracy of the UE is above the position accuracy threshold value, and broadcast a message to the one or more receivers that indicates the current position of the UE.

Some examples of the method, apparatuses, and non-transitory computer-readable medium described herein may further include operations, features, means, or instructions for receiving, from a serving base station, the position accuracy threshold value via common signaling, dedicated signaling, or application layer signaling. In some examples of the method, apparatuses, and non-transitory computer-readable medium described herein, the position accuracy threshold value may be based on a preconfigured accuracy threshold determination at the UE. In some examples of the method, apparatuses, and non-transitory computer-readable medium described herein, the identifying the position accuracy threshold value may include operations, features, means, or instructions for determining the position accuracy threshold value based on historical data of a path of the UE. In some examples of the method, apparatuses, and non-transitory computer-readable medium described herein, the current position of the UE and the current position accuracy of the UE may be based on signals received from one or more of a global navigation satellite system (GNSS), a terrestrial-based positioning system, one or more wireless network nodes, one or more sensors at the UE, or any combinations thereof.

In some examples of the method, apparatuses, and non-transitory computer-readable medium described herein, the broadcasting the message to one or more receivers includes transmitting a safety message to the one or more receivers. In some examples of the method, apparatuses, and non-transitory computer-readable medium described herein, the safety message includes one or more of a position of the UE, a speed of the UE, a heading of the UE, an acceleration of the UE, a path history of the UE, a path prediction of the UE, or any combinations thereof. In some examples of the method, apparatuses, and non-transitory computer-readable medium described herein, the safety message further indicates the current position accuracy of the UE relative to the position accuracy threshold.

In some examples of the method, apparatuses, and non-transitory computer-readable medium described herein, the position accuracy threshold value may be received at the UE in an information element as a latitude accuracy threshold value, a longitude accuracy threshold value, an altitude accuracy threshold value, and a temporal duration during which each of the threshold values are to be maintained. In some examples of the method, apparatuses, and non-transitory computer-readable medium described herein, the position accuracy threshold value may be received at the UE in an information element as one or more of a semi-major axis accuracy threshold value, semi-minor axis accuracy threshold value, a set of longitude/latitude/altitude (LLA) thresholds, a temporal duration during which each of the threshold values are to be maintained, or any combinations thereof. In some examples of the method, apparatuses, and non-transitory computer-readable medium described herein, the position accuracy threshold value may be received at the UE in a system information message that may be transmitted by a base station or a roadside unit (RSU) in common signaling to multiple UEs or dedicated signaling to a single UE. In some examples of the method, apparatuses, and non-transitory computer-readable medium described herein, the position accuracy threshold value may be transmitted in a location positioning protocol (LPP) message from a base station or a different UE.

A method for wireless communication at a base station is described. The method may include transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE, allocating resources to at least the first UE for transmission of one or more safety messages, and receiving, from at least the first UE, one or more safety messages that indicates the current position of the UE.

An apparatus for wireless communication at a base station is described. The apparatus may include a processor, memory coupled with the processor, and instructions stored in the memory. The instructions may be executable by the processor to cause the apparatus to transmit, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE, allocate resources to at least the first UE for transmission of one or more safety messages, and receive, from at least the first UE, one or more safety messages that indicates the current position of the UE.

Another apparatus for wireless communication at a base station is described. The apparatus may include means for transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE, means for allocating resources to at least the first UE for transmission of one or more safety messages, and means for receiving, from at least the first UE, one or more safety messages that indicates the current position of the UE.

A non-transitory computer-readable medium storing code for wireless communication at a base station is described. The code may include instructions executable by a processor to transmit, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE, allocate resources to at least the first UE for transmission of one or more safety messages, and receive, from at least the first UE, one or more safety messages that indicates the current position of the UE.

In some examples of the method, apparatuses, and non-transitory computer-readable medium described herein, the position accuracy threshold value may be transmitted to at least the first UE via common signaling to a set of multiple UEs, dedicated signaling to at least the first UE, or application layer signaling. In some examples of the method, apparatuses, and non-transitory computer-readable medium described herein, the position accuracy threshold value may be based on a preconfigured accuracy threshold determination. In some examples of the method, apparatuses, and non-transitory computer-readable medium described herein, the position accuracy threshold value may be based on historical data of a path of the UE. In some examples of the method, apparatuses, and non-transitory computer-readable medium described herein, the one or more safety messages may be broadcast by the first UE to one or more receivers.

In some examples of the method, apparatuses, and non-transitory computer-readable medium described herein, the one or more safety messages include one or more of a position of the first UE, a speed of the first UE, a heading of the first UE, an acceleration of the first UE, a path history of the first UE, a path prediction of the first UE, or any combinations thereof. In some examples of the method, apparatuses, and non-transitory computer-readable medium described herein, the one or more safety messages further indicate a current position accuracy of the first UE relative to the position accuracy threshold value.

In some examples of the method, apparatuses, and non-transitory computer-readable medium described herein, the position accuracy threshold value may be transmitted in an information element as a latitude accuracy threshold value, a longitude accuracy threshold value, an altitude accuracy threshold value, and a temporal duration during which each of the threshold values are to be maintained. In some examples of the method, apparatuses, and non-transitory computer-readable medium described herein, the position accuracy threshold value may be transmitted in an information element as one or more of a semi-major axis accuracy threshold value, semi-minor axis accuracy threshold value, a set of LLA thresholds, a temporal duration during which each of the threshold values are to be maintained, or any combinations thereof.

In some examples of the method, apparatuses, and non-transitory computer-readable medium described herein, the position accuracy threshold value may be transmitted in a system information message that may be transmitted by the base station in common signaling to multiple UEs or dedicated signaling to at least the first UE. In some examples of the method, apparatuses, and non-transitory computer-readable medium described herein, the position accuracy threshold value may be transmitted in a LPP message that is broadcast by the base station.

DETAILED DESCRIPTION

Figure 1:
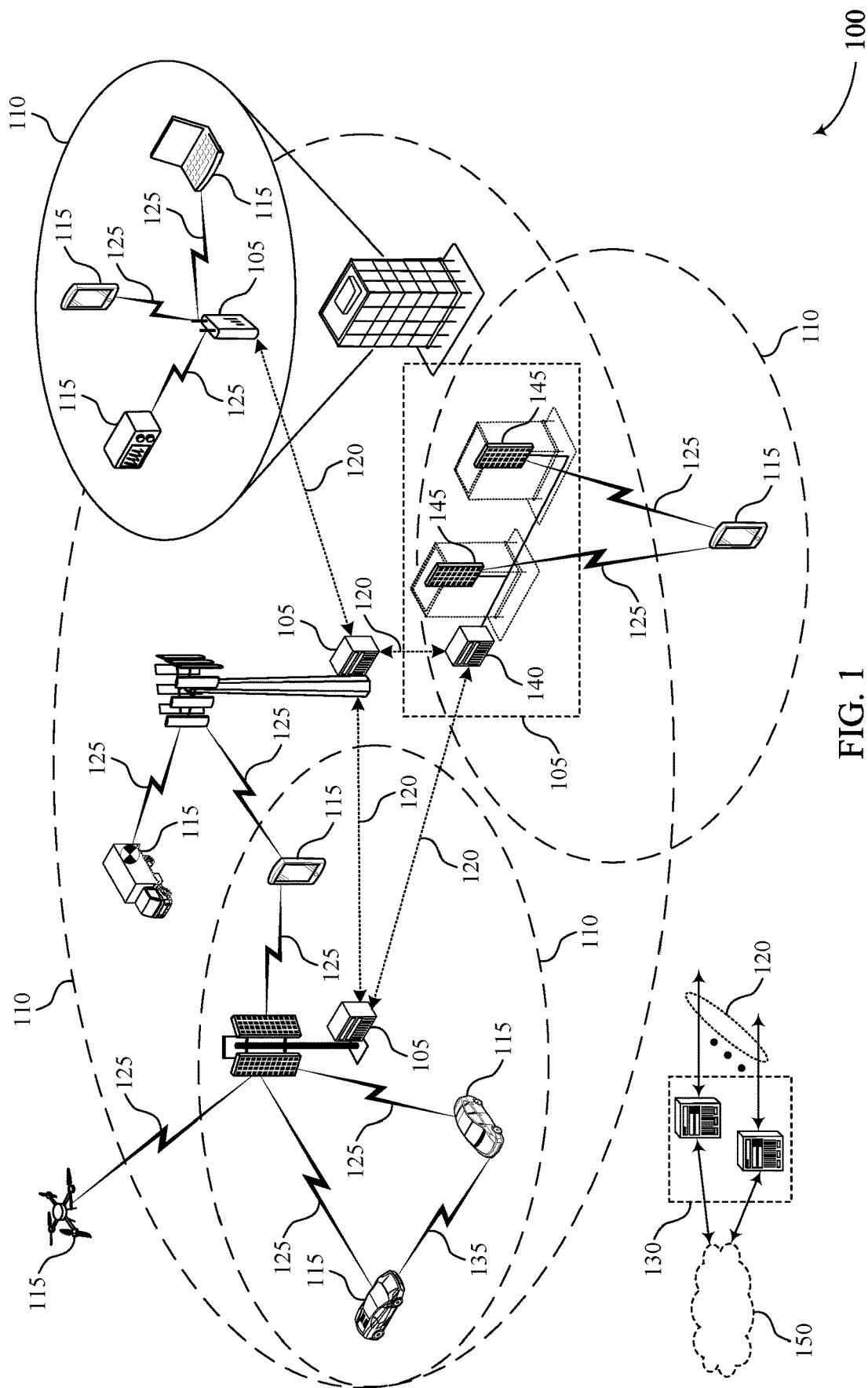
FIG. 1 illustrates an example of a wireless communications system that supports roadside user alert techniques based on location accuracy in accordance with aspects of the present disclosure.

Some wireless networks may support signaling for improving safety of vulnerable road users (VRUs) such as pedestrians, cyclists, scooters, and the like. For example, in a vehicle-to-everything (V2X) network, a user equipment (UE) carried by a VRU may broadcast safety messages to receiving devices within range of the UE (e.g., other UEs, roadside units (RSUs), base stations, vehicle UEs, or any devices that may be a safety concern for the VRU). In some cases, examples of safety messages broadcast by a UE may include personal safety messages (PSMs), vulnerable road user awareness messages (VAMs), basic safety messages (BSMs), co-operative awareness messages (CAMs), decentralized environmental notification messages (DENMs), application-layer messages, or other message types. The safety messages may include information related to a location of the UE, a motion state of the UE, a path history of the UE, path prediction of the UE, or combinations thereof, that is transmitted to one or more receivers in proximity of the VRU, such as vehicle UEs, a serving base station, a RSU, or combinations thereof. Vehicles within the V2X network may receive safety messages from nearby VRU UEs and determine to perform one or more actions that may improve safety, such as planning and executing an evasive maneuver in order to avoid a VRU. In some cases, the transmitted location information may include an accuracy measure associated with the location information (e.g., which may be defined by semi-major and semi-minor axis size, and semi-major axis orientation).

For example, using information provided in a received safety message, vehicles in the vicinity of the VRU can determine if their current location and intended path poses a hazard to the VRU (e.g., a pedestrian crossing a street the vehicle is intending to turn onto). Similarly, RSUs receiving safety messages (e.g., PSMs or BSMs) may determine if vehicles present a hazard to a VRU. This mechanism of PSM transmission and vehicle alerting allows a VRU to proceed with a greater degree of safety. However, the ability of a vehicle to determine if it presents a hazard to the VRU (or of an RSU to determine if the vehicle presents a hazard) is dependent on how accurately the VRU is able to report its position. A large uncertainty in the VRU position will degrade and potentially disable a vehicle's ability to determine if it needs to take action to avoid the VRU, rendering alerts to the driver not meaningful, and leaving the VRU with a false sense of safety. Thus, techniques to enhance safety of VRUs whose UEs have relatively poor positioning accuracy would be desirable.

In accordance with various aspects of the present disclosure, described techniques provide for a VRU UE that indicates to the user whether a current position accuracy (or location accuracy) is sufficient or insufficient for approaching vehicles to determine if they present a hazard to the VRU. In some cases, the UE position accuracy may be based on an accuracy threshold that is configured at the UE, such as by a serving base station or a RSU (e.g., via common or dedicated signaling, or through application-layer signaling), or may be pre-configured in the UE. The position accuracy threshold may be based on historical data collected by the UE associated with a particular VRU path, for example. When the VRU UE position accuracy exceeds the specified threshold, the UE may inform the user (i.e., the VRU) through an alert or notice that approaching vehicles will be unable to determine their location with enough accuracy to take evasive maneuvers. In some examples, the UE may provide the alert or notice upon the position accuracy exceeding the threshold. In other examples, the alert or notice may be provided when the threshold is exceeded for a particular interval of time. For example, a position accuracy threshold of 1.5 meters and a time interval of 60 seconds may be configured at the UE, and if the UE position accuracy is above this threshold for the interval of time (e.g., if a position accuracy of 5 meters is present for 60 seconds), the UE may generate a notice to the VRU. Thus, the VRU is provided with information related to the ability of vehicles to perform evasive maneuvers, and allows the VRU to proceed with greater caution. In some cases, safety messages may include a position accuracy of the UE, or an indication of whether the position accuracy of the UE is above or below the threshold value. Techniques as discussed herein may thus enhance safety for VRUs based on a positioning accuracy of a UE associated with the VRU.

Aspects of the disclosure are initially described in the context of wireless communications systems. Aspects of the disclosure are further illustrated by and described with reference to V2X environments, process flows, apparatus diagrams, system diagrams, and flowcharts that relate to roadside user alert techniques based on location accuracy.

FIG. 1 illustrates an example of a wireless communications system 100 that supports roadside user alert techniques based on location accuracy in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming.

The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

As described above, the wireless communications system 100 may include UEs 115 and base stations 105, which may support signaling techniques to improve the safety of VRUs. For example, a UE 115 may be carried by a VRU, such as a pedestrian. The VRU may transmit safety messages to other UEs 115, such as vehicles, and the other UEs may determine to perform one or more actions based on receiving the one or more safety messages. In some cases, a UE 115 may determine whether a positioning accuracy of the UE 115 is within a positioning accuracy threshold and generate an alert to the user in the event that relatively poor positioning accuracy is being experienced, and thus allow the user (e.g., a VRU) to proceed caution based on the inability of other UEs 115 to perform evasive maneuvers.

As described herein, the term "VRU" may be used to refer to a VRU associated with a UE 115. For example, a pedestrian carrying or otherwise associated with a UE may be an example of a VRU. Similarly, a cyclist, a runner, a scooter rider, or any other example of a person within the vicinity of one or more vehicles may be referred to as a VRU. As described herein, the term VRU is understood to be associated with one or more UEs 115. Additionally, as described herein, the acronym "UE" (e.g., UE 115) may be used to describe wireless devices such as cellular phones as well as vehicles. For examples, vehicles in the wireless communications system 100 may be referred to as UEs 115.

Figure 2:
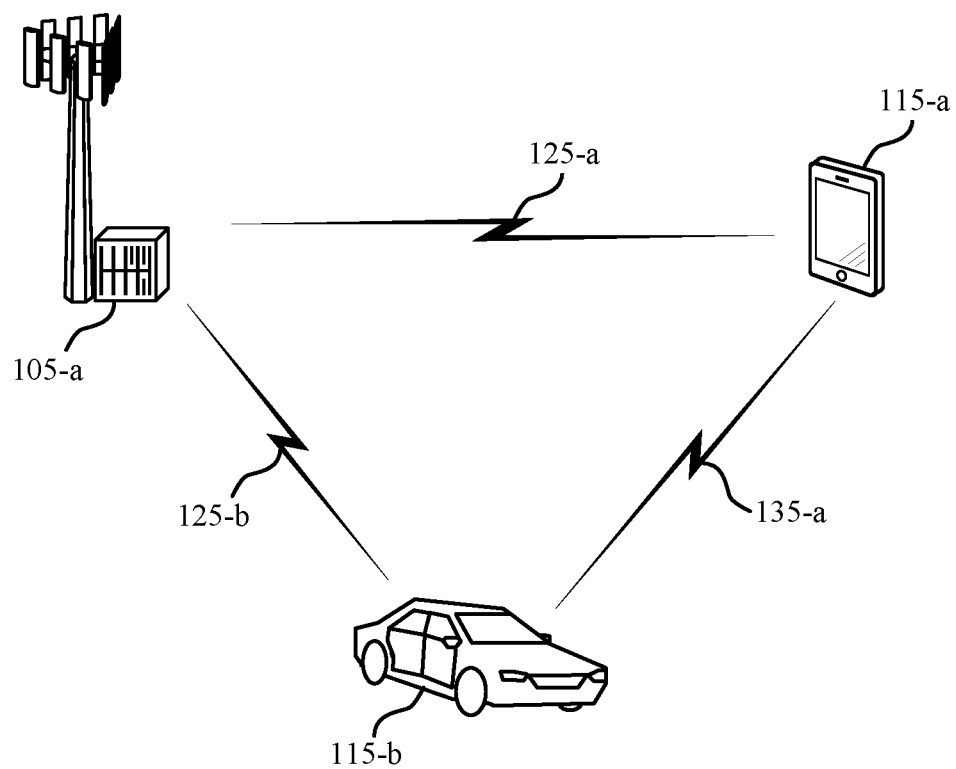
FIG. 2 illustrates an example of a wireless communications system that supports roadside user alert techniques based on location accuracy in accordance with aspects of the present disclosure.

FIG. 2 illustrates an example of a wireless communications system 200 that supports roadside user alert techniques based on location accuracy in accordance with aspects of the present disclosure. The wireless communications system 200 may implement aspects of the wireless communications system 100. For example, the wireless communications system 200 may include a base station 105-a, a first UE 115-a, and a second UE 115-b, which may be examples of a corresponding base station 105 and UEs 115 as described with reference to FIG. 1. In some cases, the base station 105-a and the UEs 115 may communicate over communication links 125, which may be examples of communication links 125 as described with reference to FIG. 1. As described herein, the first UE 115-a may be associated with a VRU and may transmit safety messages (e.g., to base station 105-a via communications link 125-a and/or to the second UE 115-b via communications link 135-a). For example, the first UE 115-a may be carried by a VRU, such as a pedestrian or cyclist. Additionally or alternatively, a vehicle in a V2X network may be an example of second UE 115-a. For example, the second UE 115-b may be a vehicle in a V2X network that is capable of receiving safety messages (e.g., from first UE 115-a via communications link 135-a or from base station 105-a via communications link 125-b) and taking actions (e.g., evasive maneuvers) responsive to one or more safety messages.

The wireless communications system 200 may support signaling for improving safety of VRUs. For example, the safety messages transmitted by the first UE 115-a may alert other UEs 115 to a presence or a trajectory of the first UE 115-a. In some cases, the first UE 115-a may be associated with (e.g., carried by) a VRU. The VRU may be located on or near a roadway, within a vicinity of the second UE 115-b. In some cases, the VRU may be performing an activity within the vicinity of the second UE 115-b, such as walking, running, cycling, or any other activity where the VRU may be positioned within a proximity of the second UE 115-b or a roadway. In such cases, the first UE 115-a may be configured to transmit (e.g., broadcast, groupcast, multicast) one or more safety messages, which may be received by the second UE 115-b. The second UE 115-b may receive the one or more safety messages and perform one or more actions based on receiving the one or more safety messages. For example, the second UE 115-b may receive the one or more safety messages and perform one or more collision avoidance operations, reduce or increase its speed, perform a lane change, or any other operation or evasive maneuver which may result in improved safety conditions for the VRU.

The wireless communications system 200 may support a variety of safety message types. In some cases, safety messages may be transmitted by the first UE 115-a. In other cases, safety messages may be transmitted by the second UE 115-b. For example, some UEs 115, such as vehicles, may be configured for specific safety message types. Similarly, some UEs 115, such as cellular phones, may be configured for other safety message types. In some cases, safety messages transmitted by the second UE 115-b may include one or more BSMs, one or more CAMs, one or more DENMs, one or more application-layer messages, or one or more other message types. In some cases, safety messages transmitted by the first UE 115-a may include one or more PSMs, one or more VAMs, one or more application-layer messages, or one or more other message types.

Safety messages transmitted by UEs 115 may include information related to the UE 115 and the user of the UE 115 (e.g., a VRU). The first UE 115-a may transmit (e.g., broadcast) a safety message indicating a location of the first UE 115-a, a motion state of the first UE 115-a (e.g., if the first UE 115-a is in motion, if the first UE 115-a is stationary, a speed of the first UE 115-a, a velocity of the UE first 115-a, an acceleration of the first UE 115-a, a position accuracy of the first UE 115-*a*, or any combinations thereof), historical (e.g., learned) information associated with the first UE 115-*a* (e.g., a path history of the first UE 115-*a* when in proximity of the current position), predictive information associated with the first UE 115-*a* or other information. The information included in the safety message transmitted by the first UE 115-*a* may be implicitly associated with the user of the first UE 115-*a* (e.g., a VRU). For example, a VRU may perform an activity such as walking, or the VRU may be stationary and the first UE 115-*a* may store, measure, or transmit information associated with the VRU, such as information related to the speed or position of the VRU.

The first UE 115-*a* may broadcast one or more safety messages (e.g., PSMs), which may include the information associated with the VRU. Accordingly, one or more second UEs 115-*b* (e.g., one or more vehicles in a V2X network) may receive the one or more safety messages and perform one or more actions based on receiving the one or more safety messages. For example, the second UE 115-*b* may receive a PSM from the first UE 115-*a*, which may indicate that the VRU carrying the first UE 115-*a* is performing an activity, such as cycling, within a proximity of the second UE 115-*b*. The PSM may additionally or alternatively indicate a speed of the VRU, a path prediction associated with the VRU, a location accuracy of the VRU, or any combinations thereof. The second UE 115-*b* may determine to reduce its speed or perform a lane change based on receiving the PSM including the path predication associated with the VRU. As a result, the likelihood of a collision between the second UE 115-*b* and the VRU may be reduced and safety may be improved for the VRU and the driver of the second UE 115-*b*. Additionally or alternatively, the first UE 115-*a* may transmit one or more safety messages, which may be received by one or more RSUs (e.g., base station 105-*a* may be an example of a RSU). The one or more RSUs may receive the one or more safety messages and may perform one or more actions based on receiving the one or more safety messages. For example, an RSU may retransmit a safety message to a second UE 115-*b* or one or more other RSUs.

As discussed herein, in some cases a positioning system of the first UE 115-*a* may not be able to determine a UE position to a fine degree of accuracy. For example, the first UE 115-*a* may determine its position based on signals received from a global navigation satellite system (GNSS). In some cases, additionally or alternatively, the first UE 115-*a* may determine its position based on a terrestrial-based positioning system, wireless network nodes (e.g., Wi-Fi signals or network-assisted cellular network signals), one or more sensors at the UE (e.g., inertial sensors at the UE), or any combinations thereof. Along with position information, the positioning system at the first UE 115-*a* may provide an estimated accuracy of a determined position. For example, if the first UE 115-*a* is using a GNSS for positioning and has an unobstructed view of the sky with few sources of interference (e.g., buildings or dense vegetation) nearby, the estimated accuracy may be relatively precise, leading to a relatively low potential error in the determined position. In cases where the first UE 115-*a* is located in an area that is less conducive to receiving unobstructed GNSS signals (e.g., in a tunnel or between large buildings), the estimated accuracy may be less precise, leading to relatively high potential error in the determined position.

In some cases, the first UE 115-*a* may provide an indication to the VRU whether a current position accuracy (or location accuracy) is sufficient or insufficient for approaching vehicles to determine if they present a hazard to the VRU. In some cases, the UE position accuracy may be based on an accuracy threshold that is configured at the first UE 115-*a*, such as by serving base station 105-*a* or a RSU (e.g., via common or dedicated signaling, or through application-layer signaling), or may be pre-configured in the first UE 115-*a*. The position accuracy threshold may be based on historical data collected by the first UE 115-*a* associated with a particular VRU path, for example. When the first UE 115-*a* position accuracy exceeds the specified threshold for a particular interval of time, the first UE 115-*a* may inform the VRU that approaching vehicles (e.g., second UE 115-*b*) will be unable to determine their location with enough accuracy to take evasive maneuvers. For example, a position accuracy threshold of 1.5 meters and a time interval of 60 seconds may be configured at the first UE 115-*a*, and if the first UE 115-*a* position accuracy is above this threshold for the interval of time (e.g., if a position accuracy of 5 meters is present for 60 seconds), the first UE 115-*a* may generate a notice to the VRU. Thus, the VRU is provided with information related to the ability of vehicles to perform evasive maneuvers, and allows the VRU to proceed with greater caution. In some cases, safety messages may include a position accuracy of the first UE 115-*a*, or an indication of whether the position accuracy of the first UE 115-*a* is above or below the threshold value. Techniques as discussed herein may thus enhance safety for VRUs based on a positioning accuracy of a UE 115 associated with the VRU.

In some cases, the positioning accuracy threshold value (e.g., positioning accuracy and associated time duration of the position accuracy) may be configured at the first UE 115-*a* by a network node such as the base station 105-*a* or a RSU in a V2C communications system. In some cases, the network node may provide one or more information elements (e.g., transmitted over a PC5 or a Uu interface) in network signaling (e.g., via signaling of a location positioning protocol (LPP)). In some cases, the first UE 115-*a* may provide the alert to the VRU using software on the first UE 115-*a* with a specific human-machine interface (HMI). For example, a specific chime or vibration pattern may indicate that the first UE 115-*a* has a positioning accuracy that is insufficient for vehicles in proximity to perform avoidance maneuvers. In some cases, signaling may be provided to the first UE 115-*a* in one or more information elements that are transmitted via application layer signaling, via radio resource control (RRC) signaling, in a medium access control (MAC) control element (CE), in LPP signaling, or any combinations thereof. In one example, the base station 105-*a* may signal the first UE 115-*a* with longitude/latitude/altitude (LLA) information of the accuracy threshold for a vehicle to determine if a defensive maneuver is required using the example information elements below:

```
UE-Location Accuracy ::= SEQUENCE {
    ue-LocationAccuracyLat    UE-LocationAccuracyLat,
    ue-LocationAccuracyLon    UE-LocationAccuracyLon,
    ue-LocationAccuracyAlt    UE-LocationAccuracyAlt,
    ue-LocationAccuracyDur    UE-LocationAccuracyDur
}
```

```
UE-LocationAccuracyLat ::= ENUMERATED {deg0dot01, deg0dot05, deg0dot1,
deg1, deg5, deg10, spare }
UE-LocationAccuracyLon ::= ENUMERATED {deg0dot01, deg0dot05, deg0dot1,
deg1, deg5, deg10, spare }
UE-LocationAccuracyAlt ::= ENUMERATED {m0dot01, m0dot05, m0dot1, m1,
``` in which:

| UE-LocationAccuracy field description |
|---|
| UE-LocationAccuracyLat<br>Specifies the UE latitude location accuracy. Value deg0dot01 means an accuracy in degrees of latitude of 0.01 degrees, value deg1 means 1 degree, and so on.<br>UE-LocationAccuracyLon<br>Specifies the UE longitude location accuracy a UE must meet to be a sidelink positioning anchor. Value deg0dot01 means an accuracy in degrees of longitude of 0.01 degrees, value deg1 means 1 degree, and so on.<br>UE-LocationAccuracyAlt<br>Specifies the UE altitude location accuracy a UE must meet to be a sidelink positioning anchor. Value m0dot01 means 0.01 meters, value m1 means 1 meter and so on.<br>UE-LocationAccuracyDur<br>Specifies the temporal duration in seconds a UE must maintain location accuracy. Value 1 means 1 second, value 2 means 2 seconds and so on. |

In another example, the base station 105-*a* may signal the first UE 115-*a* with LLA integer value information that is mapped to an accuracy threshold for a vehicle to determine if a defensive maneuver is required using the example information elements below:

```
UE-LocationAccuracy ::= SEQUENCE {
    ue-LocationAccuracyLat      UE-LocationAccuracyLat,
    ue-LocationAccuracyLon      UE-LocationAccuracyLon,
    ue-LocationAccuracyAlt      UE-LocationAccuracyAlt,
    ue-LocationAccuracyDur      UE-LocationAccuracyDur
}
UE-LocationAccuracyLat ::= INTEGER (1..1000)
UE-LocationAccuracyLon ::= INTEGER (1..1000)
UE-LocationAccuracyAlt ::= INTEGER (1..1000)
UE-LocationAccuracyDur ::= INTEGER. (0..1000) OPTIONAL
}
``` in which:

| UE-LocationAccuracy field description |
|---|
| UE-LocationAccuracyLat<br>Specifies the UE latitude location accuracy. Value 1 corresponds to 0.1 meters, value 2 corresponds to 0.2 meters, and so on.<br>UE-LocationAccuracyLon<br>Specifies the UE longitude location accuracy a UE must meet to be a sidelink positioning anchor. Value 1 corresponds to 0.1 meters, value 2 corresponds to 0.2 meters, value deg1 means 1 degree, and so on.<br>UE-LocationAccuracyAlt<br>Specifies the UE altitude location accuracy a UE must meet to be a sidelink positioning anchor. Value 1 corresponds to 0.1 meters, value 2 corresponds to 0.2 meters, and so on.<br>UE-LocationAccuracyDur<br>Specifies the temporal duration in seconds a UE must maintain location accuracy. Value 1 means 1 second, value 2 means 2 seconds and so on. |

In another example, the base station 105-*a* may signal the first UE 115-*a* with semi-major and semi-minor axes information as an enumerated list for an accuracy threshold for a vehicle to determine if a defensive maneuver is required using the example information elements below:

```
UE-LocationAccuracy ::= SEQUENCE {
    ue-SemiMajorAxisAccuracy              UE-SemiMajorAxisAccuracy,
    ue-SemiMinorAxisAccuracy              UE-SemiMinorAxisAccuracy,
    ue-SemiMajorAxisOrientationAccuracy   UE-SemiMajorAxisOrientationAccuracy,
    ue-LocationAccuracyDur                UE-LocationAccuracyDur
UE-SemiMajorAxisAccuracy                  ::= ENUMERATED {m0dot1, m0dot5, m1, m5, m10, spare, spare }
UE-SemiMinorAxisAccuracy                  ::= ENUMERATED {m0dot1, m0dot5, m1, m5, m10, spare, spare }
``` in which:

| UE-LocationAccuracy field description |
| --- |
| UE-SemiMajorAxisAccuracy<br>Specifies the UE semi-major axis accuracy. Value m0dot1 means an accuracy in of 0.1 meters, value m0dot5 means 0.5 meters, and so on.<br>UE-SemiMinorAxisAccuracy<br>Specifies the UE semi-minor axis accuracy. Value m0dot1 means an accuracy in of 0.1 meters, value m0dot5 means 0.5 meters, and so on.<br>UE-SemiMajorAxisOrientationAccuracy<br>Specifies the UE semi-major axis orientation in degrees from WGS84 north. Value 0 means 0 degrees, Value 1 means 0.1 degrees, and so on.<br>UE-LocationAccuracyDur<br>Specifies the temporal duration in seconds a UE must maintain location accuracy. Value 1 means 1 second, value 2 means 2 seconds and so on. |

In another example, the base station 105-*a* may signal the first UE 115-*a* with semi-major and semi-minor axes information as integer values for an accuracy threshold for a vehicle to determine if a defensive maneuver is required using the example information elements below:

```
UE-LocationAccuracy ::= SEQUENCE {
    ue-SemiMajorAxisAccuracy              UE-SemiMajorAxisAccuracy,
    ue-SemiMinorAxisAccuracy              UE-SemiMinorAxisAccuracy,
    ue-SemiMajorAxisOrientationAccuracy   UE-SemiMajorAxisOrientationAccuracy,
    ue-LocationAccuracyDur                UE-LocationAccuracyDur
}
UE-SemiMajorAxisAccuracy                  ::= INTEGER (1..1000)
UE-SemiMinorAxisAccuracy                  ::= INTEGER (1.. 1000)
UE-SemiMajorAxisOrientationAccuracy       ::= INTEGER (0..3600)
UE-LocationAccuracyDur                    ::= INTEGER (0..1000) OPTIONAL
``` in which:

| UE-LocationAccuracy field description |
| --- |
| UE-SemiMajorAxisAccuracy<br>Specifies the UE semi-major axis accuracy. Value 1 corresponds to 0.1 meters, value 2 corresponds to 0.2 meters, and so on.<br>UE-SemiMinorAxisAccuracy<br>Specifies the UE semi-minor axis accuracy. Value 1 corresponds to 0.1 meters, value 2 corresponds to 0.2 meters, and so on.<br>UE-SemiMajorAxisOrientationAccuracy<br>Specifies the UE semi-major axis orientation in degrees from WGS84 north. Value 0 means 0 degrees, Value 1 means 0.1 degrees, and so on.<br>UE-LocationAccuracyDur<br>Specifies the temporal duration in seconds a UE must maintain location accuracy. Value 1 means 1 second, value 2 means 2 seconds and so on. |

In other cases, the base station 105-a may provide a cell-wide configuration for an accuracy threshold for a vehicle to determine if a defensive maneuver is required using the example information element (e.g., which may be provided in an existing system information block (SIB) or as part of a new SIB) below that provides an anchor accuracy threshold (e.g., a sidelink positioning anchor accuracy threshold is added to existing SIB12 IE: SL-UE-Selected-Config-r16):

```
-- ASN1START
-- TAG-SL-UE-SELECTEDCONFIG-START
SL-UE-SelectedConfig-r16 ::=          SEQUENCE {
    sl-PSSCH-TxConfigList-r16              SL-PSSCH-TxConfigList-r16 OPTIONAL, --
Need R
    sl-ProbResourceKeep-r16                ENUMERATED {v0, v0dot2, v0dot4, v0dot6,
v0dot8}                      OPTIONAL, --NeedR
    sl-ReselectAfter-r16                   ENUMERATED {n1, n2, n3, n4, n5, n6, n7, n8, n9}
                                 OPTIONAL, -- Need R
    sl-CBR-CommonTxConfigList-r16          SL-CBR-CommonTxConfigList-r16
                                 OPTIONAL, -- Need R
    ul-PrioritizationThres-r16             INTEGER (1..16)
                        OPTIONAL,   -- Need R
    sl-PrioritizationThres-r16             INTEGER (1.. 8)
                        OPTIONAL,   -- Need R
    ue-LocationAccuracy                    UE-LocationAccuracy
    ...
}
-- TAG-SL-UE-SELECTEDCONFIG-STOP
-- ASN1STOP
```

In further examples, the base station 105-a may provide a cell-wide configuration for an accuracy threshold using the below example information element (IE), where the IE may be included in an existing SIB, or included as part of a new SIB:

```
-- ASN1START
-- TAG-SL-UE-POSITIONINGCONFIG-START
SL-UE-LocationConfig-r16 ::=          SEQUENCE {
    ue-LocationAccuracy          UE-LocationAccuracy
    ...
}
-TAG-SL-UE-POSITIONINGCONFIG-STOP
- ASN1STOP
```

Figure 3A:
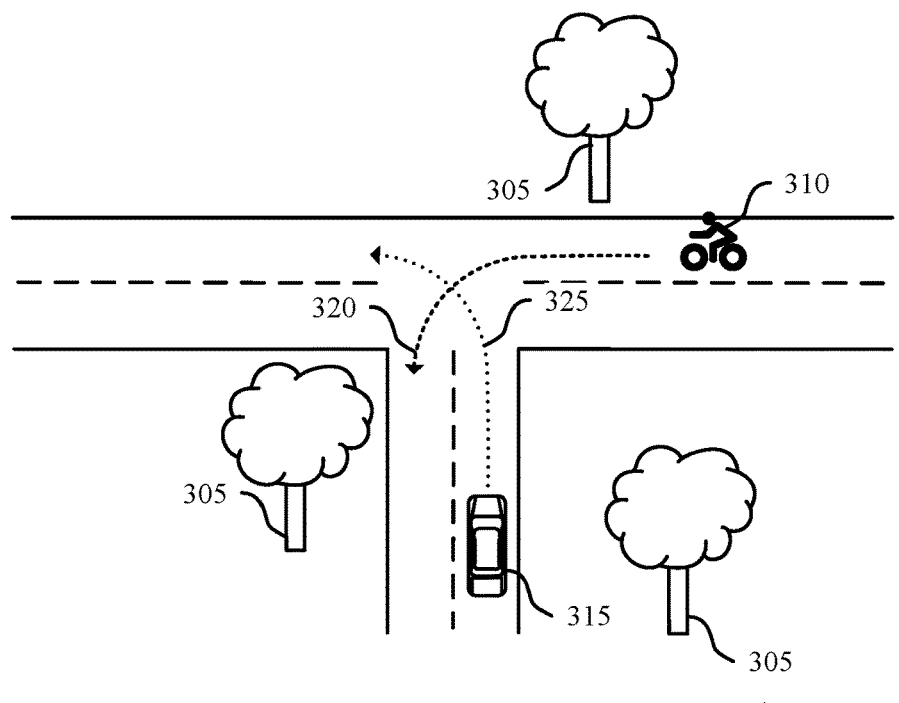
FIGS. 3A and 3B illustrate examples of vehicle-to-everything (V2X) environments that support roadside user alert techniques based on location accuracy in accordance with aspects of the present disclosure.
Figure 3B:
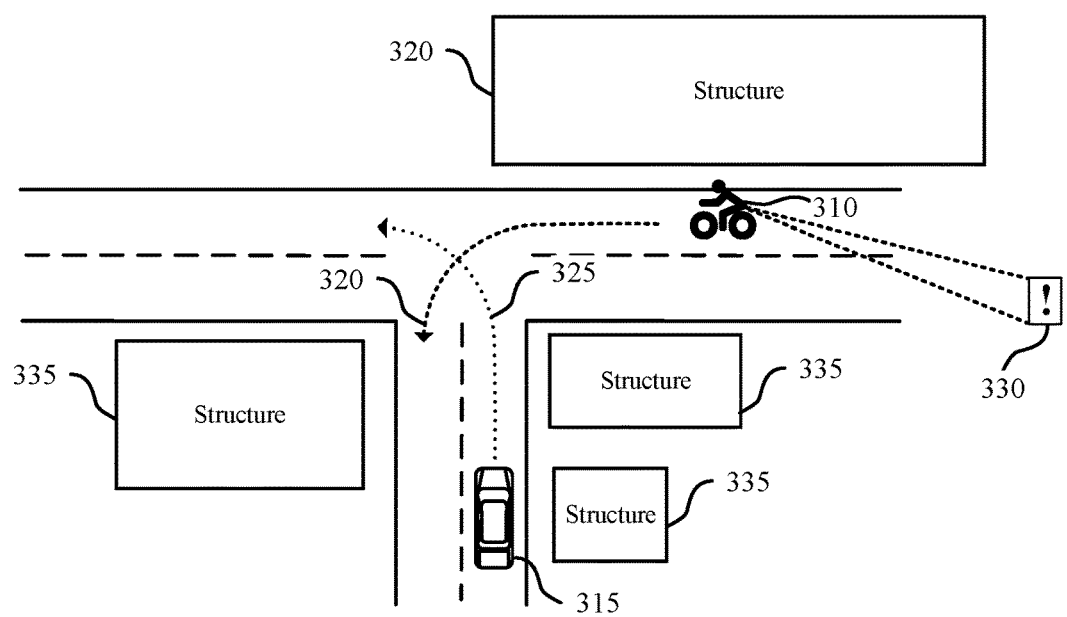

FIGS. 3A and 3B illustrate example of V2X environments 300 that support roadside user alert techniques based on location accuracy in accordance with aspects of the present disclosure. The V2X environments 300 may implement aspects of the wireless communications systems 100 or 200. For example, the V2X environments 300 may include VRU 310, which may have an associated VRU UE and vehicle 315 which may be an example of a vehicle UE, where such UEs may be examples of corresponding UEs 115 as described with reference to FIGS. 1 and 2. A VRU 310, as described herein may be an example of a road user or a person otherwise located within the vicinity of road, or other area where vehicle 315 with associated UEs are operated. For example, the VRU 310 may be a cyclist in the examples of FIGS. 3A and 3B.

In a first V2X environment 300-a of FIG. 3A, the VRU 310 may be in a relatively open area with unobstructed signal paths for positioning system signals, with this example including several trees 305 that do not provide significant obstruction for signaling that is to be received at the VRU UE for positioning determination. In this example, the VRU 310 may intend to follow path 320 that crosses with an intended path 325 of the vehicle 315. In this example, the UE of the VRU 310 may have relatively good positioning accuracy such that the positioning accuracy is less than the accuracy threshold that is configured at the VRU 310 UE (e.g., positioning accuracy less than or equal to 1.5 meters) for a relatively long period of time (e.g., a time period that exceeds a configured location accuracy duration). In such cases, the UE of the VRU 310 may transmit safety messages that may be received at the vehicle 315, and in the event that the safety message indicates that a collision could occur, the vehicle 315 may alert an operator of VRU(s) 410 in the vicinity and the vehicle 315 may take action to avoid a collision (e.g., slow down).

In a second V2X environment 300-b of FIG. 3B, the VRU 310 may be in a relatively dense area with obstructed signal paths due to relatively tall structures 335 in proximity to the roadway. In this example, the VRU 310 may again intend to follow path 320 that crosses with an intended path 325 of the vehicle 315. In this example, however, the UE of the VRU 310 may have relatively poor positioning accuracy such that the positioning accuracy exceeds the accuracy threshold that is configured at the VRU 310 UE (e.g., positioning accuracy that exceeds 1.5 meters). In such cases, the UE of the VRU 310 may generate an alert 330 to the VRU, that indicates that the UE is unable to provide sufficient positioning accuracy to allow the vehicle 315 to perform an avoidance procedure. In some cases, the UE at the VRU may transmit safety messages that indicate that the positioning accuracy is not sufficient to allow for avoidance procedures at other UEs (e.g., the safety messages may indicate a positioning accuracy value or an indication of whether positioning accuracy meets a threshold value for enabling avoidance maneuvers). In such a case the VRU 310 may take additional precautions beyond the typical safety precautions (e.g., moving to an edge of the roadway or other area where the VRU 310 and vehicle 315 are more readily visible to each other, moving further into a bike lane or onto a sidewalk, etc.). Likewise, the vehicle 315 UE may provide a notice to the vehicle operator that VRUs are in the area but may not be able to provide accurate positioning information, which may allow the operator of the vehicle 315 to take additional safety precautions (e.g., to slow down and be alert for VRUs). The safety messages transmitted and received from the one or more UEs may be BSMs, CAMs, DENMs, application-layer messages (e.g., signal phase and timing (SPAT) messages, intersection map (MAP) messages), or any other safety message type.

Figure 4A:
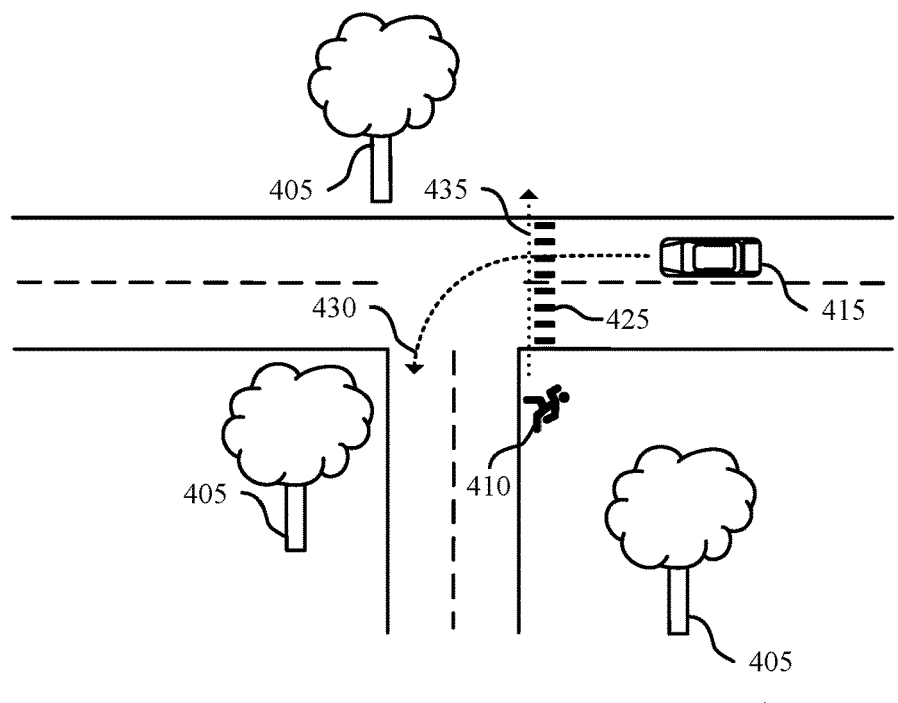
FIGS. 4A and 4B illustrate examples of V2X environments that support roadside user alert techniques based on location accuracy in accordance with aspects of the present disclosure.
Figure 4B:
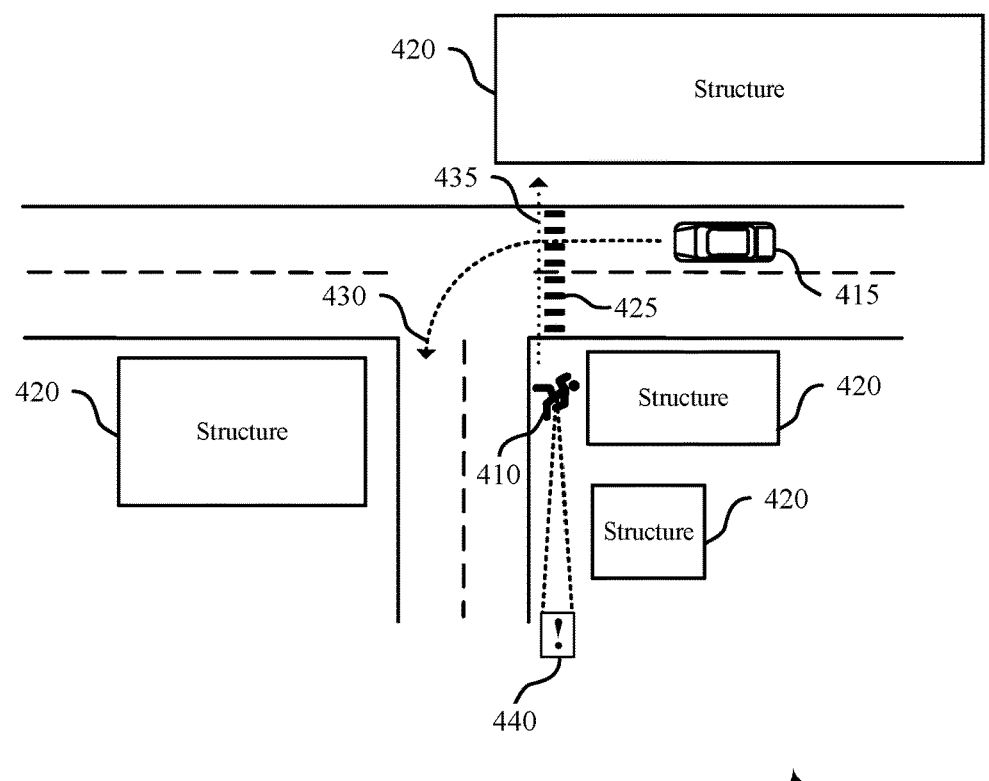

FIGS. 4A and 4B illustrate further examples of V2X environments 400 that support roadside user alert techniques based on location accuracy in accordance with aspects of the present disclosure. The V2X environments 400 may implement aspects of the wireless communications systems 100 or 200. For example, the V2X environments 400 may include VRU 410, which may have an associated VRU UE and vehicle 415 which may be an example of a vehicle UE, where such UEs may be examples of corresponding UEs 115 as described with reference to FIGS. 1 and 2. A VRU 410, as described herein may be an example of a road user or a person otherwise located within the vicinity of road, or other area where vehicle 415 with associated UEs are operated. For example, the VRU 410 may be a cyclist in the examples of FIGS. 4A and 4B.

In these examples, the VRU 410 may be a jogger that has an intended path 435 that crosses a crosswalk 425, where the intended path 430 of vehicle 415. In a first V2X environment 400-a of FIG. 4A, the VRU 410 may be in a relatively open area with unobstructed signal paths for positioning system signals, with this example including several trees 405 that do not provide significant obstruction for signaling that is to be received at the VRU UE for positioning determination. In this example, the UE of the VRU 410 may have relatively good positioning accuracy such that the positioning accuracy is less than the accuracy threshold that is configured at the VRU 410 UE (e.g., positioning accuracy less than or equal to 1.5 meters) for a relatively long period of time (e.g., a time period that exceeds a configured location accuracy duration). In such cases, the UE of the VRU 410 may transmit safety messages that may be received at the vehicle 415, and in the event that the safety message indicates that a collision could occur, the vehicle 415 may alert an operator of VRU(s) 410 in the vicinity and take action to avoid a collision (e.g., slow down).

In a second V2X environment 400-b of FIG. 4B, the VRU 410 may be in a relatively dense area with obstructed signal paths due to relatively tall structures 420 in proximity to the roadway. In this example, the VRU 410 may again intend to follow path 435 that crosses crosswalk 425 and an intended path 430 of the vehicle 415. In this example, however, the UE of the VRU 410 may have relatively poor positioning accuracy such that the positioning accuracy exceeds the accuracy threshold that is configured for the VRU 410 UE (e.g., positioning accuracy that exceeds 1.5 meters). In such cases, the UE of the VRU 410 may generate an alert 440 to the VRU, that indicates that the UE is unable to provide sufficient positioning accuracy to allow the vehicle 415 to perform an avoidance procedure. In some cases, the UE at the VRU 410 may transmit safety messages that indicate that the positioning accuracy is not sufficient to allow for avoidance procedures at other UEs (e.g., the safety messages may indicate a positioning accuracy value or an indication of whether positioning accuracy meets a threshold value for enabling avoidance maneuvers). In such a case the VRU 410 may take additional precautions beyond the typical safety precautions (e.g., approaching crosswalk 425 more slowly or moving to an area where the VRU 410 and vehicle 415 are more readily visible to each other). Likewise, the vehicle 415 may provide a notice to the vehicle operator that VRUs are in the area but may not be able to provide accurate positioning information, which may allow the operator of the vehicle 415 to take additional safety precautions (e.g., to slow down and be alert for VRUs). The safety messages transmitted and received from the one or more UEs may be BSMs, CAMs, DENMs, application-layer messages (e.g., SPAT messages, MAP messages), or any other safety message type.

Figure 5:
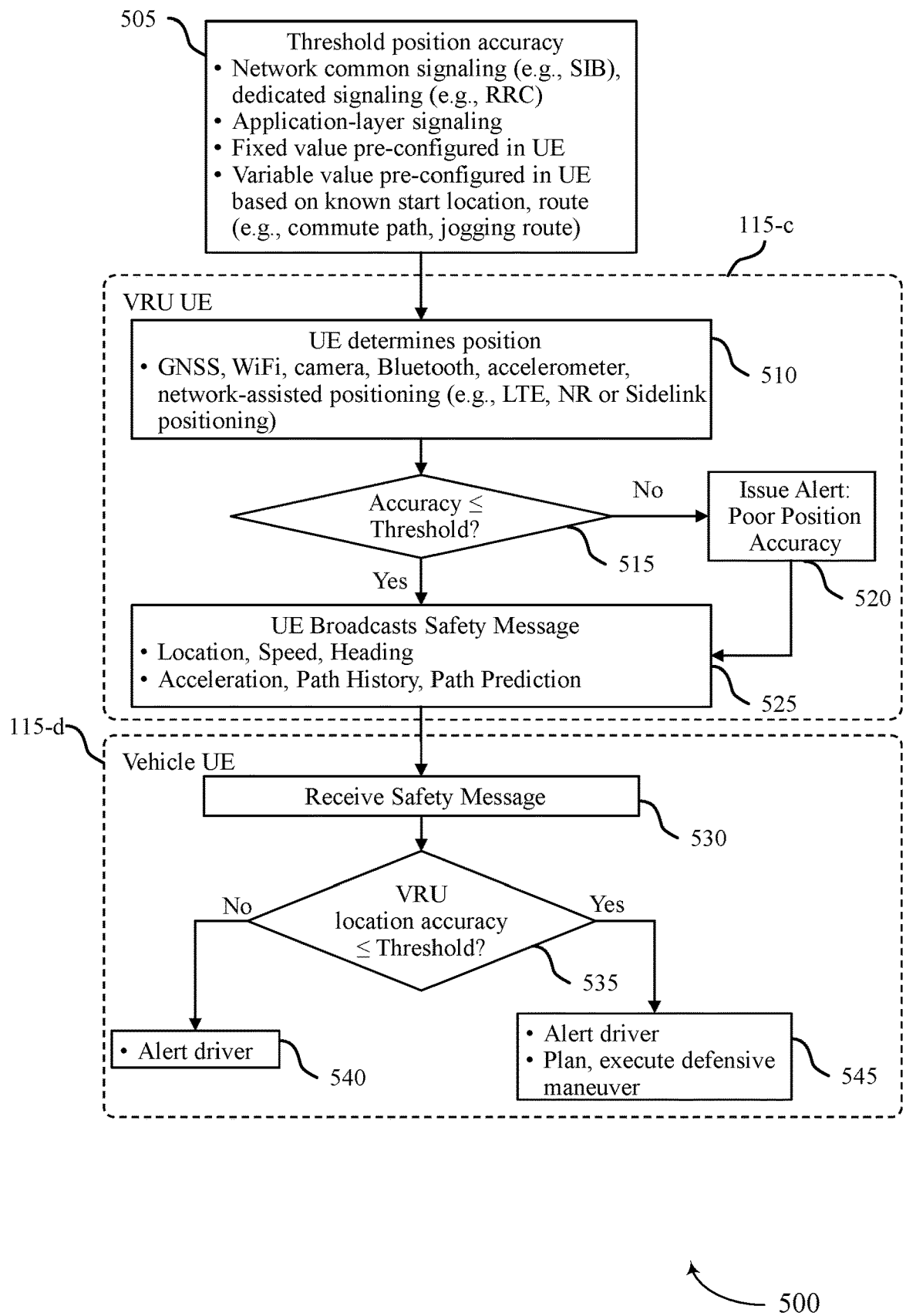
FIG. 5 illustrates an example of a flow chart illustrating a method that supports roadside user alert techniques based on location accuracy in accordance with aspects of the present disclosure.

FIG. 5 illustrates an example of a flow chart that illustrates a method 500 that supports roadside user alert techniques based on location accuracy in accordance with aspects of the present disclosure. Various operations of the method 500 may be implemented by one or more UEs (e.g., a UE associated with a VRU and a UE associated with a vehicle in proximity to the VRU), and optionally one or more network components (e.g., a RSU or serving base station), or components thereof, as described herein. For example, aspects of the method 500 may be performed by one or more UEs, RSUs, or base stations, as described with reference to FIGS. 1 through 4. In some examples, a device may execute a set of instructions to control the functional elements of the device to perform the described functions. Additionally or alternatively, the device may perform aspects of the described functions using special-purpose hardware.

In this example, at 505, a VRU UE 115-c may identify a threshold position accuracy. The threshold position accuracy may be signaled, such as through network common signaling (e.g., a SIB) or dedicated signaling (e.g., RRC, MAC-CE, DCI), or through application layer signaling. In other cases, the threshold position accuracy may be a preconfigured value at the UE, or may be a variable value that is based on preconfigured parameters that are applied to one or more predicted values, such as a known location and a historical path or routing associated with the start location (e.g., based on historical data where a VRU repeatedly follows a same route).

At 510, the VRU UE 115-c may determine a current position and a current position accuracy value (e.g., an amount of uncertainty in the determined current position). For example, the current position and associated accuracy may be based on, for example, GNSS, Wi-Fi signals, Bluetooth signals, one or more UE sensors such as a camera or accelerometer, network-assisted positioning from one or more base stations or other UEs, or any combinations thereof.

At 515, the VRU UE 115-c may determine whether the determined current position accuracy is less than the identified threshold position accuracy. For example, the VRU UE 115-c may determine whether the amount of uncertainty of the determined position exceeds the threshold value or not. At 520, if it is determined that the determined position accuracy is greater than the threshold, the VRU UE 115-c may issue an alert to the user (e.g., a visual alert, audible alert, haptic alert, or any combinations thereof, that indicates poor position accuracy). At 525, if it is determined that the determined position accuracy is less than or equal to the threshold, the VRU UE 115-c may broadcast a safety message to one or more receivers (e.g., a vehicle UE 115-d). The safety message may include, for example, a location, speed, and heading. Further, in some cases, the safety message may include an indication of acceleration, a path history, a path prediction, an indication of whether the UE position accuracy is within the threshold value, or any combinations thereof.

At 530, the vehicle UE 115-d may receive the safety message. At 535, the vehicle UE 115-d may determine whether the reported position accuracy is less than or equal to the threshold value. In cases where the reported position accuracy is not less than or equal to the threshold value, the vehicle UE 115-d may generate an alert to the vehicle driver, as indicated at 540. In cases where the reported position accuracy is less than or equal to the threshold value, the vehicle UE 115-*d* may generate the alert to the vehicle driver, and plan and execute a defensive maneuver, as indicated at 545.

Figure 6:
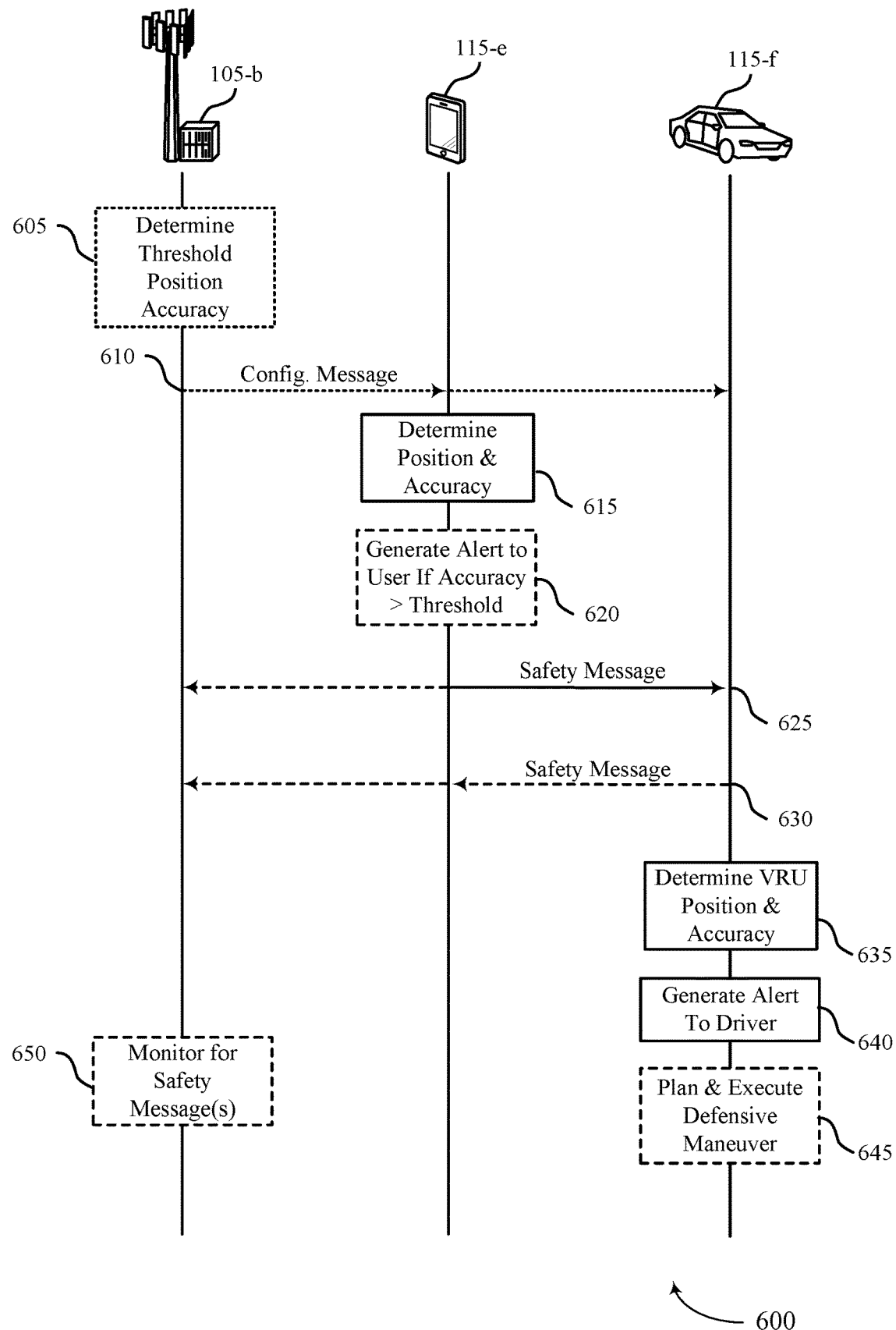
FIG. 6 illustrates an example of a process flow that supports roadside user alert techniques based on location accuracy in accordance with aspects of the present disclosure.

FIG. 6 illustrates an example of a process flow 600 that supports roadside user alert techniques based on location accuracy in accordance with aspects of the present disclosure. In some examples, process flow 600 may implement aspects of the wireless communications systems 100 and 200. For example, process flow 600 may include a VRU UE 115-*e*, a vehicle UE 115-*f*, which may be examples of corresponding UEs as described with reference to FIGS. 1 through 5. Process flow 600 may also include base station 105-*b*, which may be an example of corresponding base stations 105 of RSUs as described with reference to FIGS. 1 through 5.

In the following description of process flow 600, the operations between the UEs 115 and the base station 105-*b* may be transmitted in a different order than the order shown, or the operations may be performed at different times. Some operations may also be left out of process flow 600, or other operations may be added to process flow 600. While UEs 115 are shown performing a number of the operations of process flow 600, any wireless device may perform the operations shown.

Optionally, at 605, the base station 105-*b* may determine a threshold position accuracy for safety messages. In some cases, the base station 105-*b* may make such a determination based on a deployment area (e.g., an amount of congestion and traffic, a density of UEs, availability of GNSS or other positioning signals for served UEs, etc.), based on a historical incidences of VRUs having collisions or near misses with vehicles, or any combinations thereof. At 610, the base station 105-*b* may transmit a configuration message to one or both the VRU UE 115-*e* and vehicle UE 115-*f*. In some cases, the configuration message may be transmitted in dedicated signaling, or in common signaling.

At 615, the VRU UE 115-*e* may determine its position and position accuracy. The VRU UE 115-*e* may determine positioning based on a positioning system, as discussed herein. At 620, in the event that the position accuracy of the VRU UE 115-*e* exceeds a threshold value, the VRU UE 115-*e* may generate an alert to a user.

At 625, the VRU UE 115-*e* may transmit one or more safety messages to one or both the vehicle UE 115-*f* or the base station 105-*b*. In some cases, the one or more safety messages may be transmitted with a regular periodicity, may be transmitted responsive to detection of an event, or any combinations thereof (e.g., as configured by the configuration information). In some cases, at 630, the vehicle UE 115-*f* may transmit one or more safety messages to one or both the VRU UE 115-*e* or the base station 105-*b*. The safety messages may include PSMs, VAMs, application-layer messages, or any combinations thereof. At 635, the vehicle UE 115-*f* may determine a VRU position and position accuracy. At 640, the vehicle UE 115-*f* may, if the VRU is determined to approach within a certain distance, generate an alert to the driver of the vehicle. In some cases, if the VRU is determined to come within a critical distance of the vehicle, the vehicle UE 115-*f* may plan and execute a defensive maneuver, at 645. In some cases, at 650, the base station 105-*b* (e.g., when a RSU acts as base station 105-*b*) may monitor for safety messages as well (e.g., to determine whether configuration updates are needed, to transmit separate safety messages or information to one or multiple vehicles, or to provide information to law enforcement or traffic enforcement).

Figure 7:
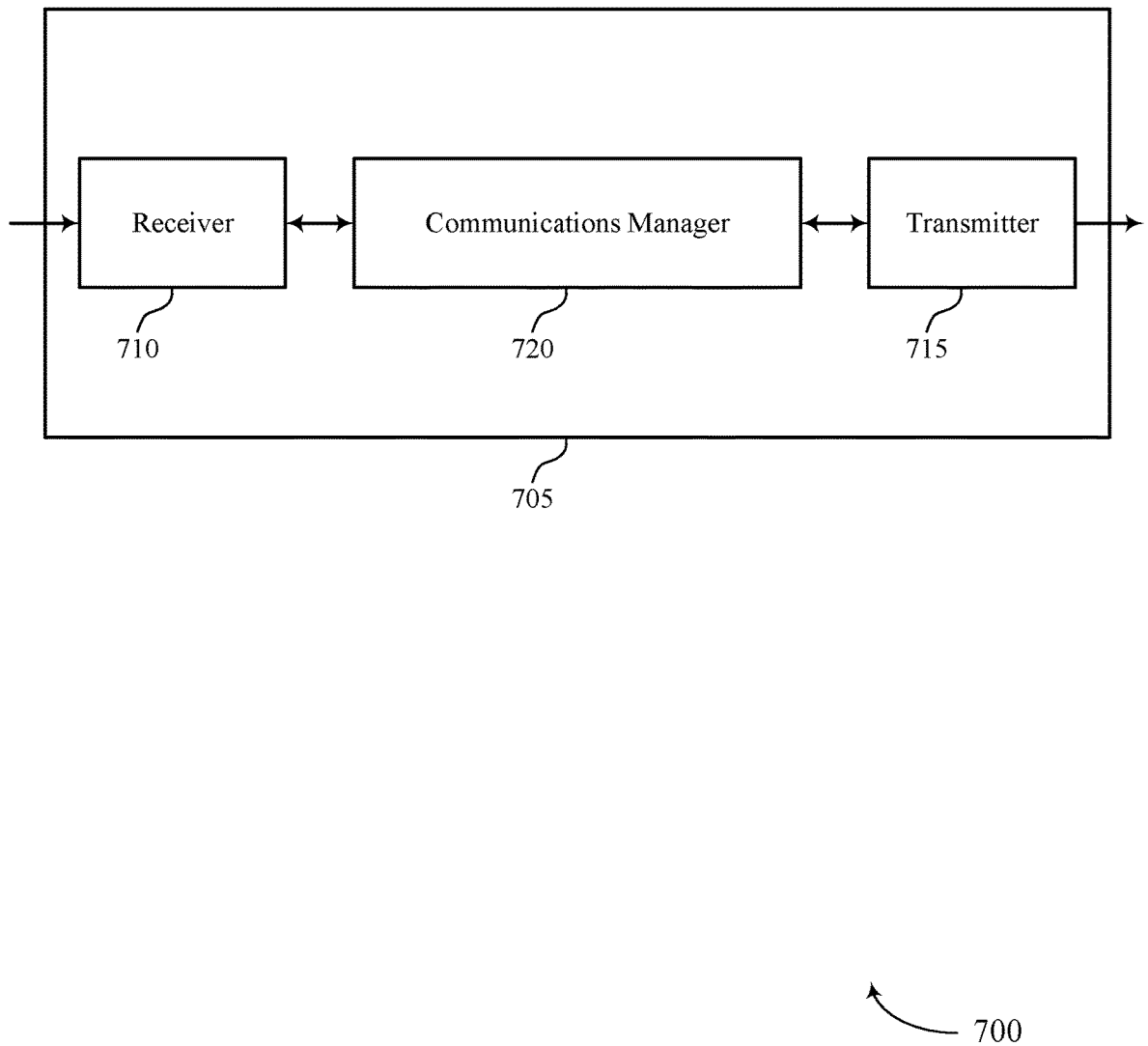
FIGS. 7 and 8 show block diagrams of devices that support roadside user alert techniques based on location accuracy in accordance with aspects of the present disclosure.

FIG. 7 shows a block diagram 700 of a device 705 that supports roadside user alert techniques based on location accuracy in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to roadside user alert techniques based on location accuracy). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to roadside user alert techniques based on location accuracy). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of roadside user alert techniques based on location accuracy as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. For example, the communications manager 720 may be configured as or otherwise support a means for identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The communications manager 720 may be configured as or otherwise support a means for generating an alert at the UE that indicates the current position accuracy of the UE is above the position accuracy threshold value. The communications manager 720 may be configured as or otherwise support a means for broadcasting a message to the one or more receivers that indicates the current position of the UE.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for enhancing safety for VRUs that may be in proximity to vehicular traffic, and provide alerts to VRUs in the event that UE positioning does not provide sufficient accuracy to enable other UEs to perform avoidance or evasive maneuvers to avoid the VRU.

Figure 8:
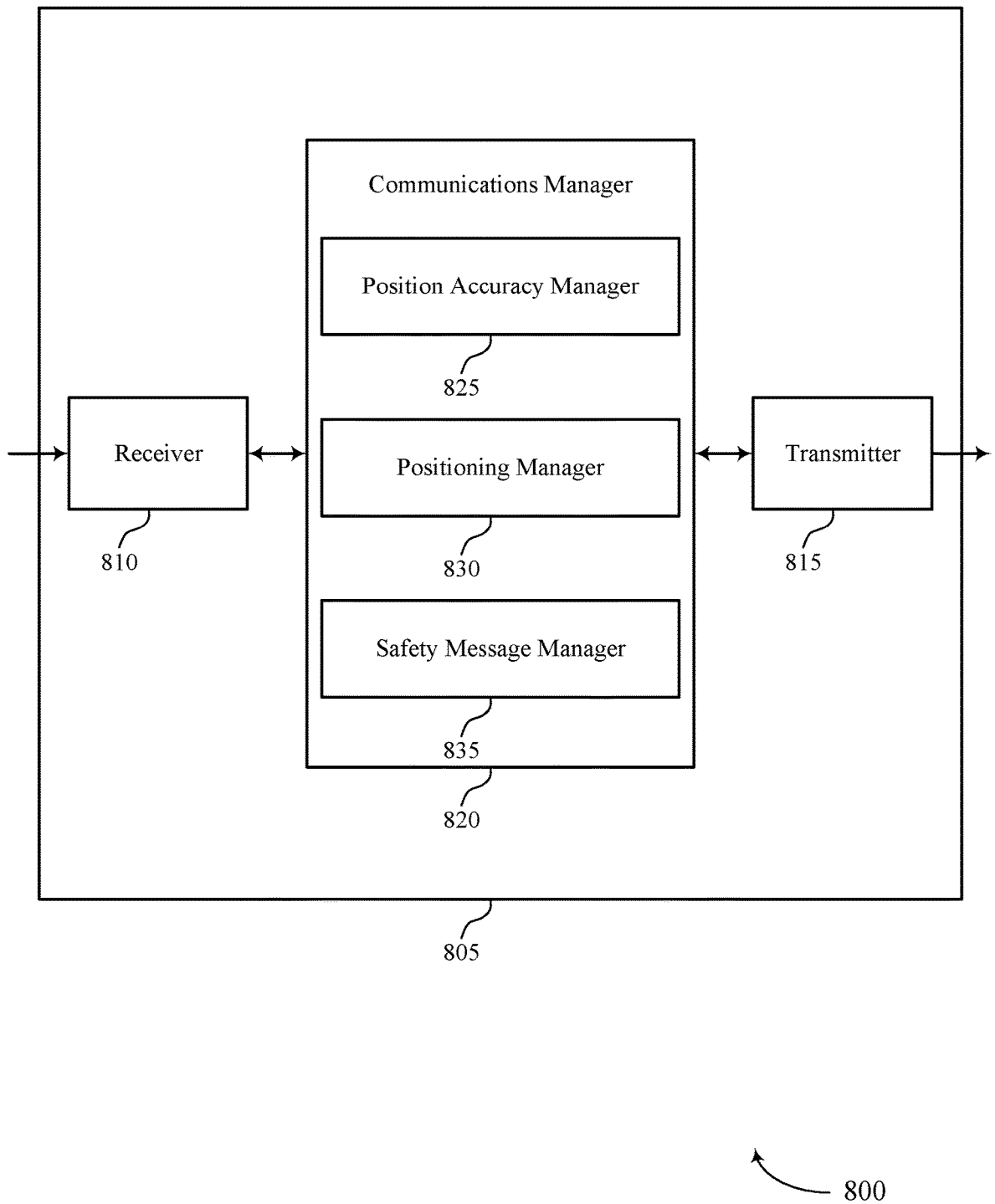

FIG. 8 shows a block diagram 800 of a device 805 that supports roadside user alert techniques based on location accuracy in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to roadside user alert techniques based on location accuracy). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to roadside user alert techniques based on location accuracy). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of roadside user alert techniques based on location accuracy as described herein. For example, the communications manager 820 may include a position accuracy manager 825, a positioning manager 830, a safety message manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a UE in accordance with examples as disclosed herein. The position accuracy manager 825 may be configured as or otherwise support a means for identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The positioning manager 830 may be configured as or otherwise support a means for generating an alert at the UE that indicates the current position accuracy of the UE is above the position accuracy threshold value. The safety message manager 835 may be configured as or otherwise support a means for broadcasting a message to the one or more receivers that indicates the current position of the UE.

Figure 9:
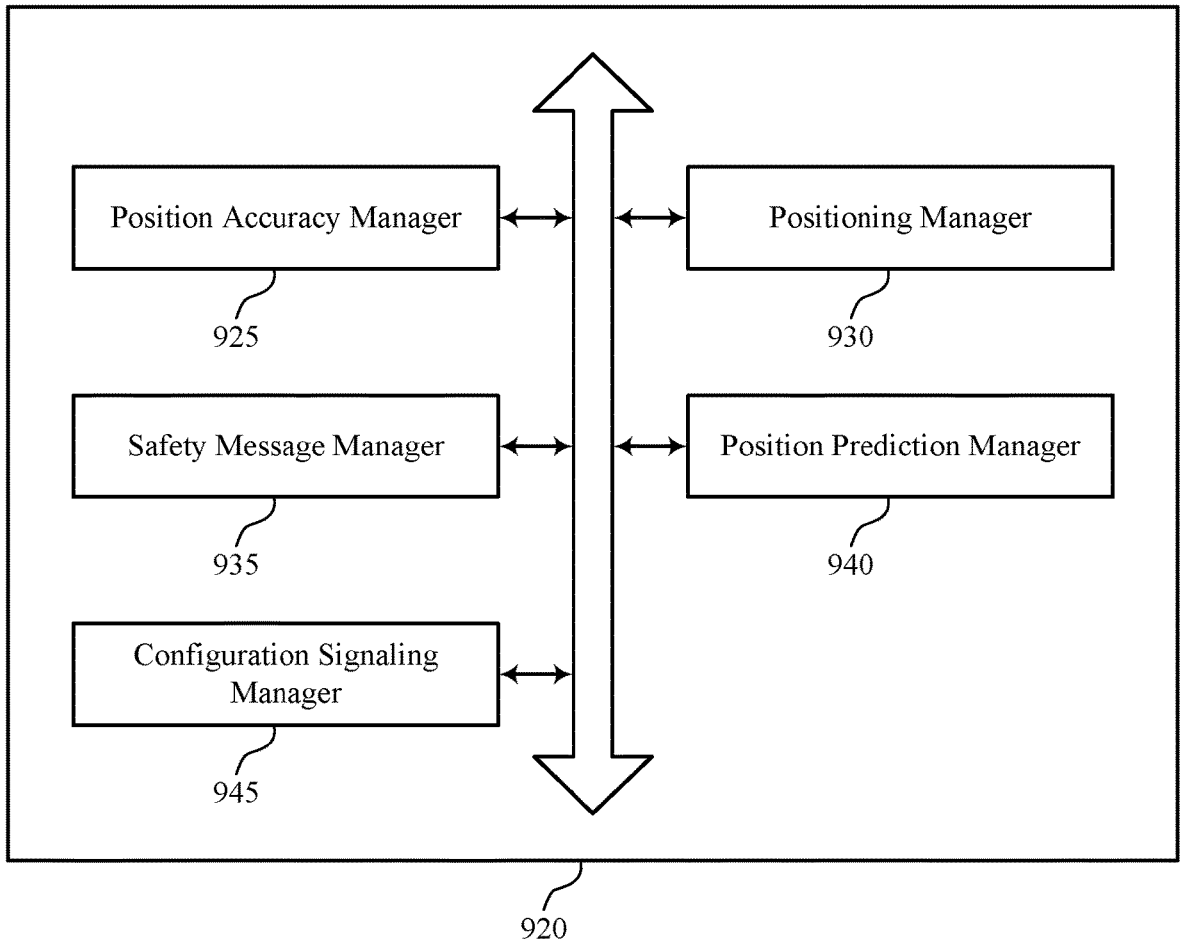
FIG. 9 shows a block diagram of a communications manager that supports roadside user alert techniques based on location accuracy in accordance with aspects of the present disclosure.

FIG. 9 shows a block diagram 900 of a communications manager 920 that supports roadside user alert techniques based on location accuracy in accordance with aspects of the present disclosure. The communications manager 920 may be an example of aspects of a communications manager 720, a communications manager 820, or both, as described herein. The communications manager 920, or various components thereof, may be an example of means for performing various aspects of roadside user alert techniques based on location accuracy as described herein. For example, the communications manager 920 may include a position accuracy manager 925, a positioning manager 930, a safety message manager 935, a position prediction manager 940, a configuration signaling manager 945, or any combination thereof. Each of these components may communicate, directly or indirectly, with one another (e.g., via one or more buses).

The communications manager 920 may support wireless communication at a UE in accordance with examples as disclosed herein. The position accuracy manager 925 may be configured as or otherwise support a means for identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The positioning manager 930 may be configured as or otherwise support a means for generating an alert at the UE that indicates the current position accuracy of the UE is above the position accuracy threshold value. The safety message manager 935 may be configured as or otherwise support a means for broadcasting a safety message to the one or more receivers that indicates the current position of the UE.

In some examples, the position accuracy manager 925 may be configured as or otherwise support a means for receiving, from a serving base station, the position accuracy threshold value via common signaling, dedicated signaling, or application layer signaling. In some examples, the position accuracy threshold value is based on a preconfigured accuracy threshold determination at the UE.

In some examples, to support identifying the position accuracy threshold value, the position prediction manager 940 may be configured as or otherwise support a means for determining the position accuracy threshold value based on historical data of a path of the UE. In some examples, the current position of the UE and the current position accuracy of the UE are based on signals received from one or more of a GNSS, a terrestrial-based positioning system, one or more wireless network nodes, one or more sensors at the UE, or any combinations thereof.

In some examples, the safety message includes one or more of a position of the UE, a speed of the UE, a heading of the UE, an acceleration of the UE, a path history of the UE, a path prediction of the UE, or any combinations thereof. In some examples, the safety message further indicates the current position accuracy of the UE relative to the position accuracy threshold.

In some examples, the position accuracy threshold value is received at the UE in an information element as a latitude accuracy threshold value, a longitude accuracy threshold value, an altitude accuracy threshold value, and a temporal duration during which each of the threshold values are to be maintained. In some examples, the position accuracy threshold value is received at the UE in an information element as a semi-major axis accuracy threshold value, semi-minor axis accuracy threshold value, and a temporal duration during which each of the threshold values are to be maintained. In some examples, the position accuracy threshold value is received at the UE in a system information message that is broadcast by a base station or a RSU. In some examples, the position accuracy threshold value is transmitted in a LPP message from a base station or a different UE.

Figure 10:
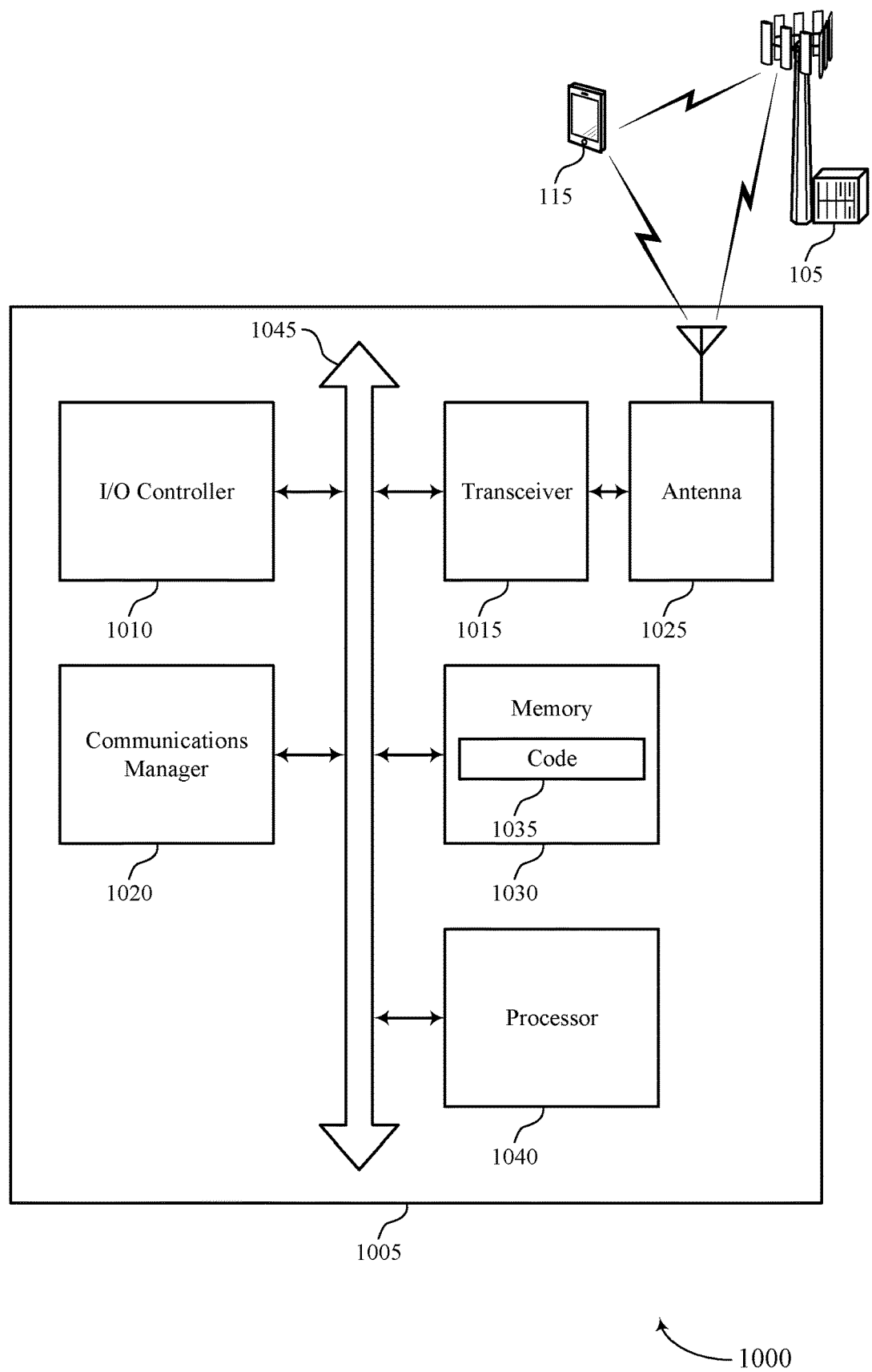
FIG. 10 shows a diagram of a system including a device that supports roadside user alert techniques based on location accuracy in accordance with aspects of the present disclosure.

FIG. 10 shows a diagram of a system 1000 including a device 1005 that supports roadside user alert techniques based on location accuracy in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting roadside user alert techniques based on location accuracy). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The communications manager 1020 may be configured as or otherwise support a means for generating an alert at the UE that indicates the current position accuracy of the UE is above the position accuracy threshold value. The communications manager 1020 may be configured as or otherwise support a means for broadcasting a message to the one or more receivers that indicates the current position of the UE.

By including or configuring the communications manager 1020 in accordance with examples as described herein, the device 1005 may support techniques for enhancing safety for VRUs that may be in proximity to vehicular traffic, and provide alerts to VRUs in the event that UE positioning does not provide sufficient accuracy to enable other UEs to perform avoidance or evasive maneuvers to avoid the VRU.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of roadside user alert techniques based on location accuracy as described herein, or the processor 1040 and the memory 1030 may be otherwise configured to perform or support such operations.

Figure 11:
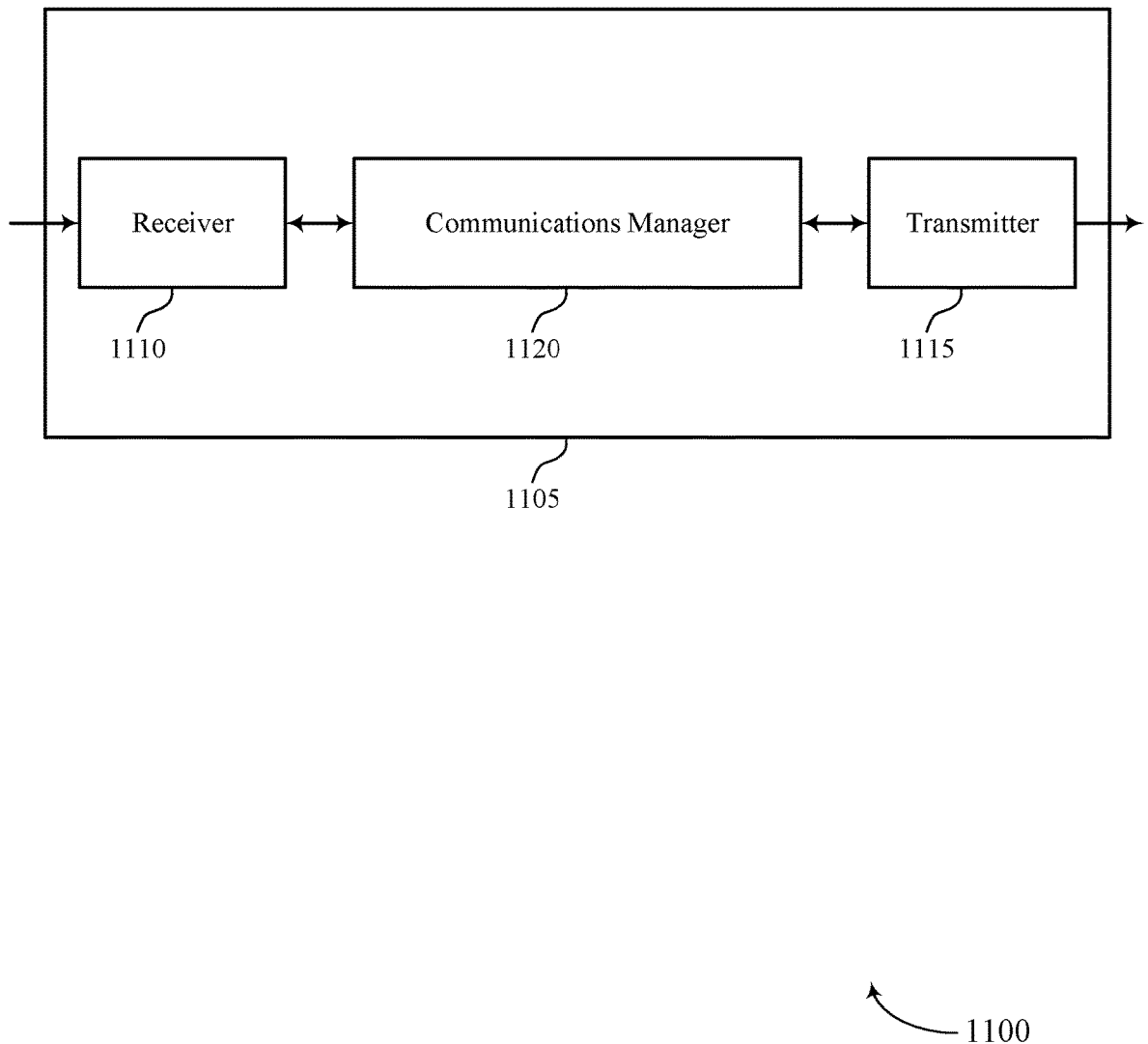
FIGS. 11 and 12 show block diagrams of devices that support roadside user alert techniques based on location accuracy in accordance with aspects of the present disclosure.

FIG. 11 shows a block diagram 1100 of a device 1105 that supports roadside user alert techniques based on location accuracy in accordance with aspects of the present disclosure. The device 1105 may be an example of aspects of a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to roadside user alert techniques based on location accuracy). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to roadside user alert techniques based on location accuracy). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of roadside user alert techniques based on location accuracy as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. For example, the communications manager 1120 may be configured as or otherwise support a means for transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE. The communications manager 1120 may be configured as or otherwise support a means for allocating resources to at least the first UE for transmission of one or more safety messages. The communications manager 1120 may be configured as or otherwise support a means for receiving, from at least the first UE, one or more safety messages that indicates the current position of the UE.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for enhancing safety for VRUs that may be in proximity to vehicular traffic, and provide alerts to VRUs in the event that UE positioning does not provide sufficient accuracy to enable other UEs to perform avoidance or evasive maneuvers to avoid the VRU.

Figure 12:
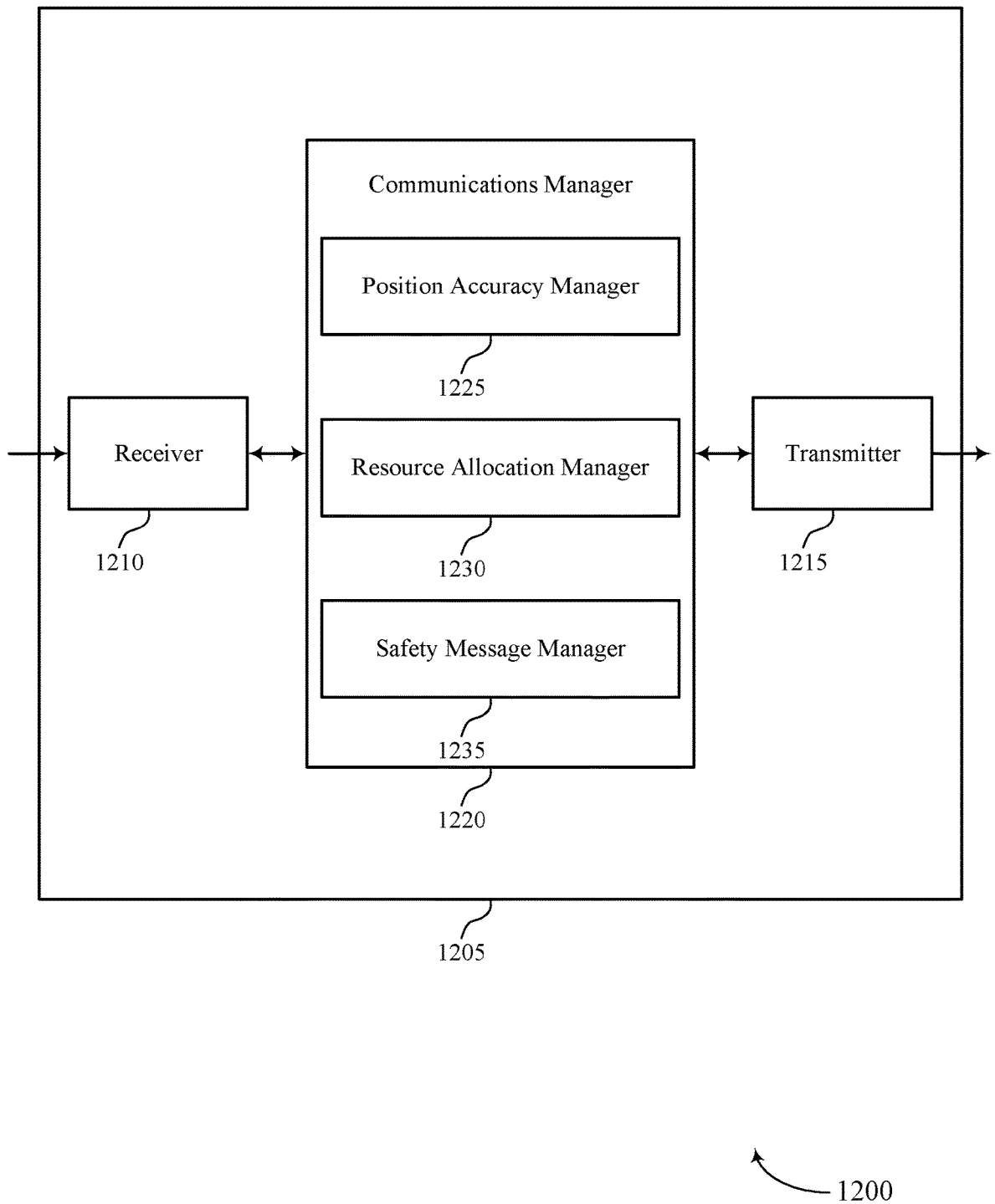

FIG. 12 shows a block diagram 1200 of a device 1205 that supports roadside user alert techniques based on location accuracy in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to roadside user alert techniques based on location accuracy). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to roadside user alert techniques based on location accuracy). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of roadside user alert techniques based on location accuracy as described herein. For example, the communications manager 1220 may include a position accuracy manager 1225, a resource allocation manager 1230, a safety message manager 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. The position accuracy manager 1225 may be configured as or otherwise support a means for transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE. The resource allocation manager 1230 may be configured as or otherwise support a means for allocating resources to at least the first UE for transmission of one or more safety messages. The safety message manager 1235 may be configured as or otherwise support a means for receiving, from at least the first UE, one or more safety messages that indicates the current position of the UE.

Figure 13:
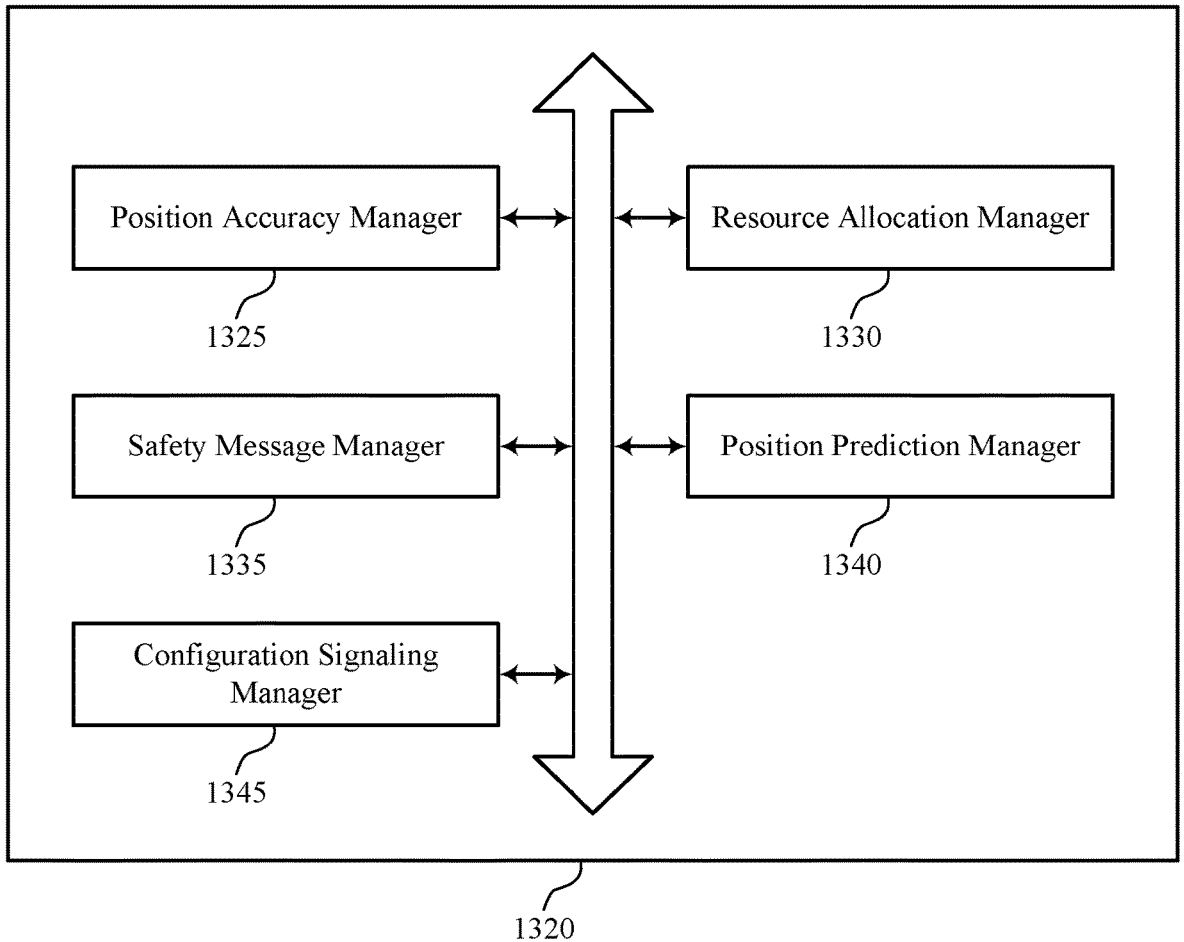
FIG. 13 shows a block diagram of a communications manager that supports roadside user alert techniques based on location accuracy in accordance with aspects of the present disclosure.

FIG. 13 shows a block diagram 1300 of a communications manager 1320 that supports roadside user alert techniques based on location accuracy in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of roadside user alert techniques based on location accuracy as described herein. For example, the communications manager 1320 may include a position accuracy manager 1325, a resource allocation manager 1330, a safety message manager 1335, a position prediction manager 1340, a configuration signaling manager 1345, or any combination thereof. Each of these components may communicate, directly or indirectly, with one another (e.g., via one or more buses).

The communications manager 1320 may support wireless communication at a base station in accordance with examples as disclosed herein. The position accuracy manager 1325 may be configured as or otherwise support a means for transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE. The resource allocation manager 1330 may be configured as or otherwise support a means for allocating resources to at least the first UE for transmission of one or more safety messages. The safety message manager 1335 may be configured as or otherwise support a means for receiving, from at least the first UE, one or more safety messages that indicates the current position of the UE.

In some examples, the position accuracy threshold value is transmitted to at least the first UE via common signaling to a set of multiple UEs, dedicated signaling to at least the first UE, or application layer signaling. In some examples, the position accuracy threshold value is based on a preconfigured accuracy threshold determination. In some examples, the position accuracy threshold value is based on historical data of a path of the UE. In some examples, the one or more safety messages are broadcast by the first UE to one or more receivers. In some examples, the one or more safety messages include one or more of a position of the first UE, a speed of the first UE, a heading of the first UE, an acceleration of the first UE, a path history of the first UE, a path prediction of the first UE, or any combinations thereof.

In some examples, the one or more safety messages further indicate a current position accuracy of the first UE relative to the position accuracy threshold value. In some examples, the position accuracy threshold value is transmitted in an information element as a latitude accuracy threshold value, a longitude accuracy threshold value, an altitude accuracy threshold value, and a temporal duration during which each of the threshold values are to be maintained. In some examples, the position accuracy threshold value is transmitted in an information element as a semi-major axis accuracy threshold value, semi-minor axis accuracy threshold value, and a temporal duration during which each of the threshold values are to be maintained. In some examples, the position accuracy threshold value is transmitted in a system information message that is broadcast by the base station to at least the first UE. In some examples, the position accuracy threshold value is transmitted in a LPP message that is broadcast by the base station.

Figure 14:
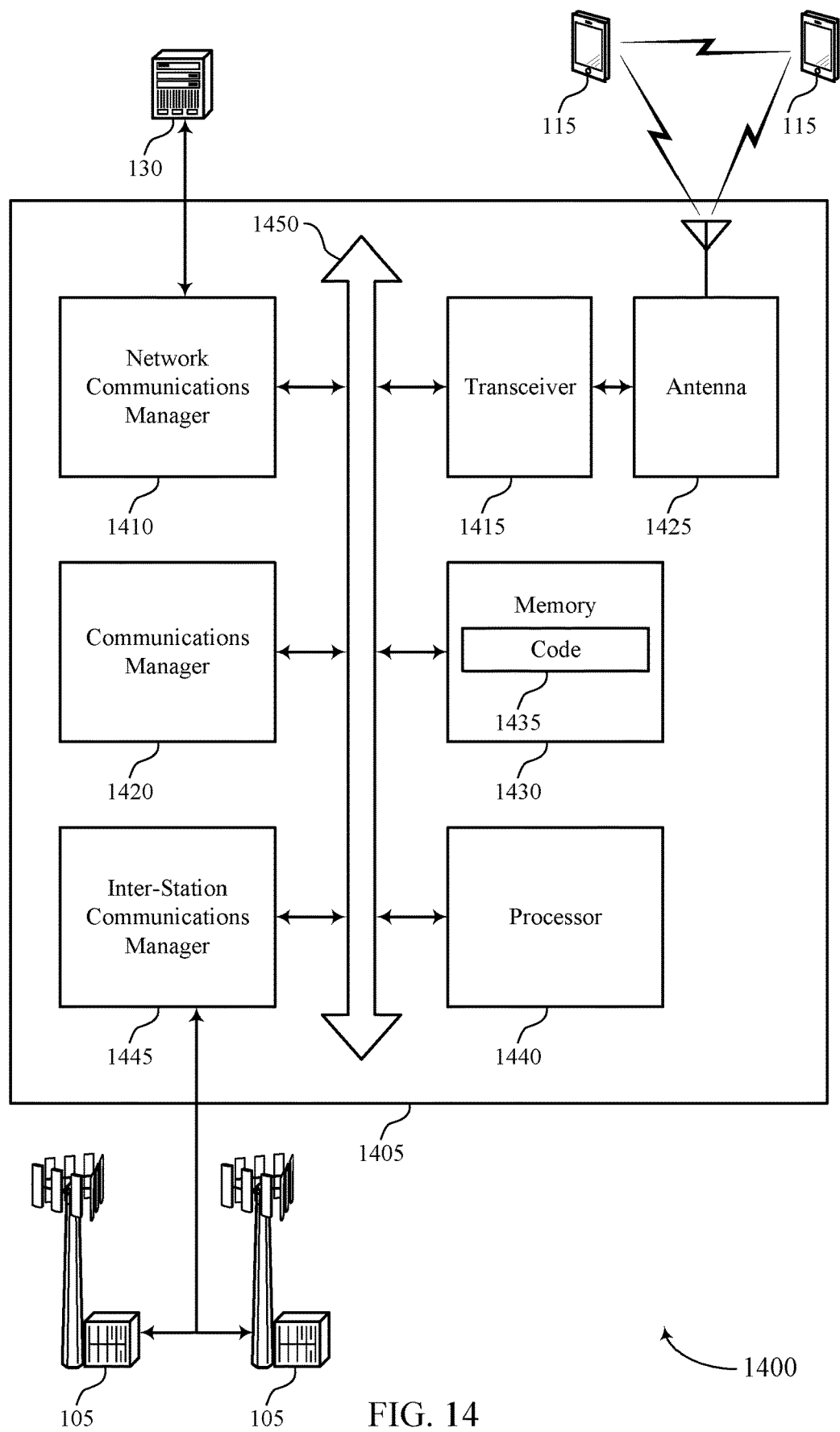
FIG. 14 shows a diagram of a system including a device that supports roadside user alert techniques based on location accuracy in accordance with aspects of the present disclosure.

FIG. 14 shows a diagram of a system 1400 including a device 1405 that supports roadside user alert techniques based on location accuracy in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting roadside user alert techniques based on location accuracy). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communication at a base station in accordance with examples as disclosed herein. For example, the communications manager 1420 may be configured as or otherwise support a means for transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE. The communications manager 1420 may be configured as or otherwise support a means for allocating resources to at least the first UE for transmission of one or more safety messages. The communications manager 1420 may be configured as or otherwise support a means for receiving, from at least the first UE, one or more safety messages that indicates the current position of the UE.

By including or configuring the communications manager 1420 in accordance with examples as described herein, the device 1405 may support techniques for enhancing safety for VRUs that may be in proximity to vehicular traffic, and provide alerts to VRUs in the event that UE positioning does not provide sufficient accuracy to enable other UEs to perform avoidance or evasive maneuvers to avoid the VRU.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of roadside user alert techniques based on location accuracy as described herein, or the processor 1440 and the memory 1430 may be otherwise configured to perform or support such operations.

Figure 15:
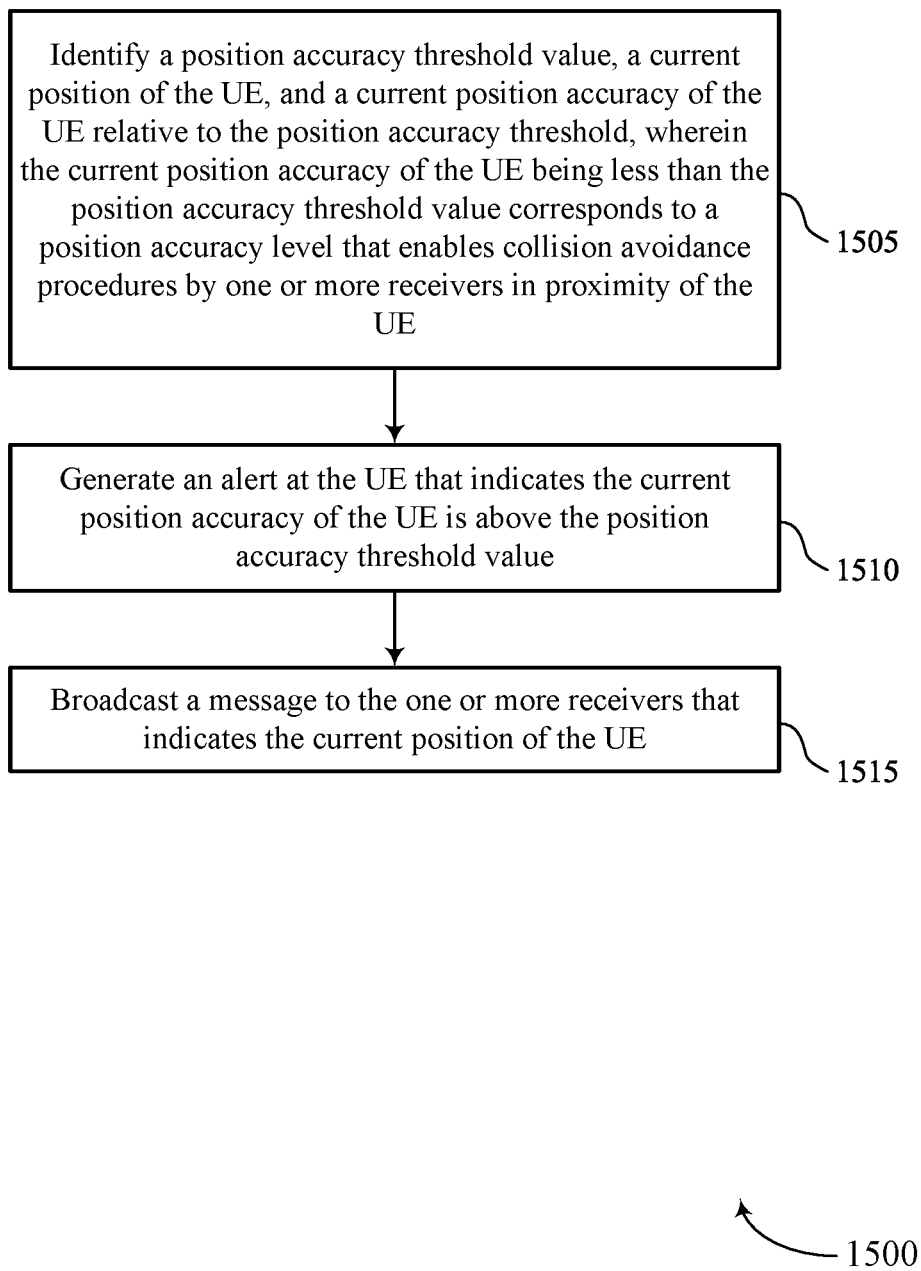
FIGS. 15 through 18 show flowcharts illustrating methods that support roadside user alert techniques based on location accuracy in accordance with aspects of the present disclosure.

FIG. 15 shows a flowchart illustrating a method 1500 that supports roadside user alert techniques based on location accuracy in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The operations of 1505 may be performed in accordance with examples as disclosed herein. In some examples, aspects of the operations of 1505 may be performed by a position accuracy manager 925 as described with reference to FIG. 9.

At 1510, the method may include generating an alert at the UE that indicates the current position accuracy of the UE is above the position accuracy threshold value. The operations of 1510 may be performed in accordance with examples as disclosed herein. In some examples, aspects of the operations of 1510 may be performed by a positioning manager 930 as described with reference to FIG. 9.

At 1515, the method may include broadcasting a message to the one or more receivers that indicates the current position of the UE (e.g., a safety message such as a PSM, VAM, application-layer message, or any combinations thereof). The operations of 1515 may be performed in accordance with examples as disclosed herein. In some examples, aspects of the operations of 1515 may be performed by a safety message manager 935 as described with reference to FIG. 9.

Figure 16:
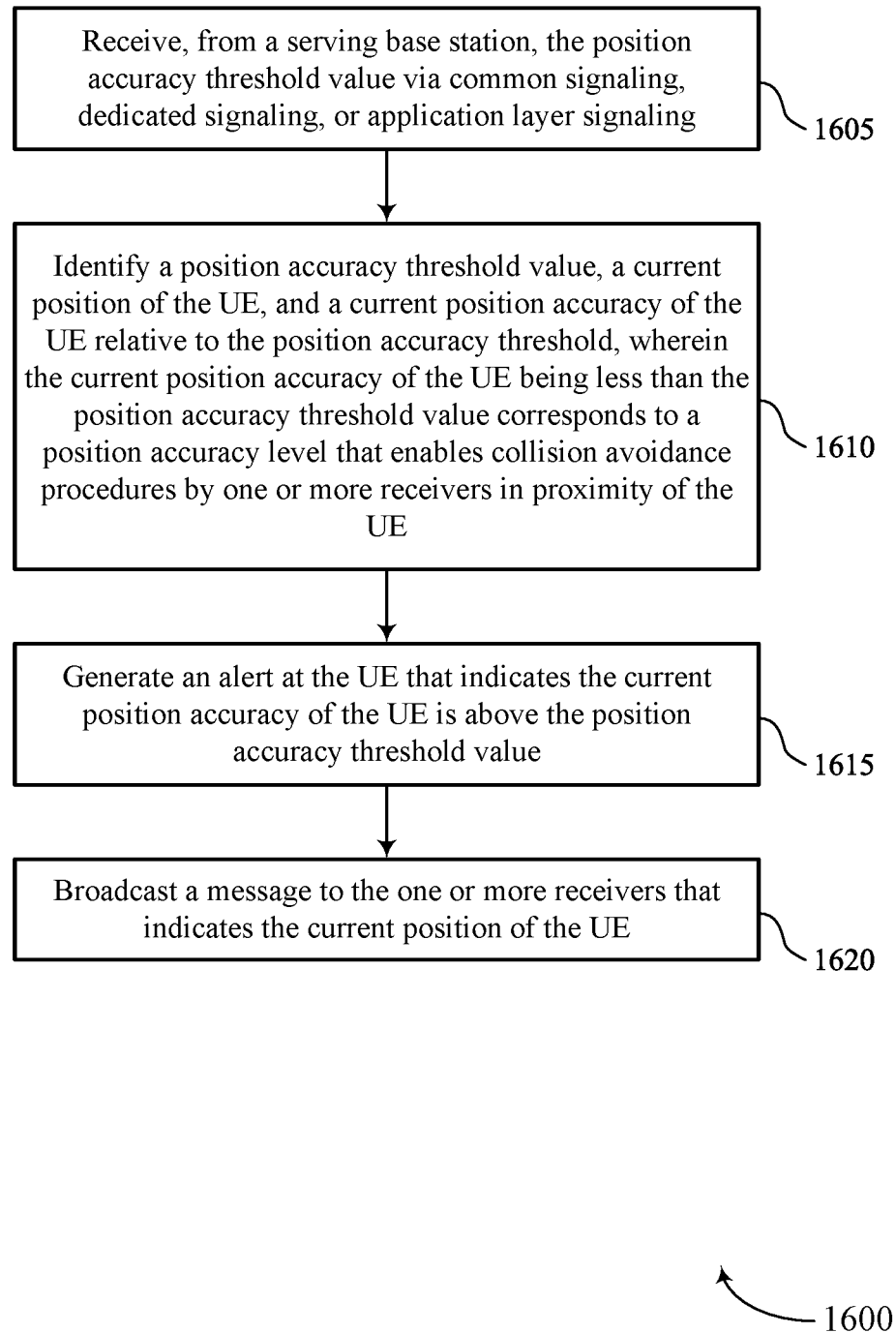

FIG. 16 shows a flowchart illustrating a method 1600 that supports roadside user alert techniques based on location accuracy in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a serving base station, the position accuracy threshold value via common signaling, dedicated signaling, or application layer signaling. The operations of 1605 may be performed in accordance with examples as disclosed herein. In some examples, aspects of the operations of 1605 may be performed by a position accuracy manager 925 as described with reference to FIG. 9.

At 1610, the method may include identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The operations of 1610 may be performed in accordance with examples as disclosed herein. In some examples, aspects of the operations of 1610 may be performed by a position accuracy manager 925 as described with reference to FIG. 9.

At 1615, the method may include generating an alert at the UE that indicates the current position accuracy of the UE is above the position accuracy threshold value. The operations of 1615 may be performed in accordance with examples as disclosed herein. In some examples, aspects of the operations of 1615 may be performed by a positioning manager 930 as described with reference to FIG. 9.

At 1620, the method may include broadcasting a message to the one or more receivers that indicates the current position of the UE. The operations of 1620 may be performed in accordance with examples as disclosed herein. In some examples, aspects of the operations of 1620 may be performed by a safety message manager 935 as described with reference to FIG. 9.

Figure 17:
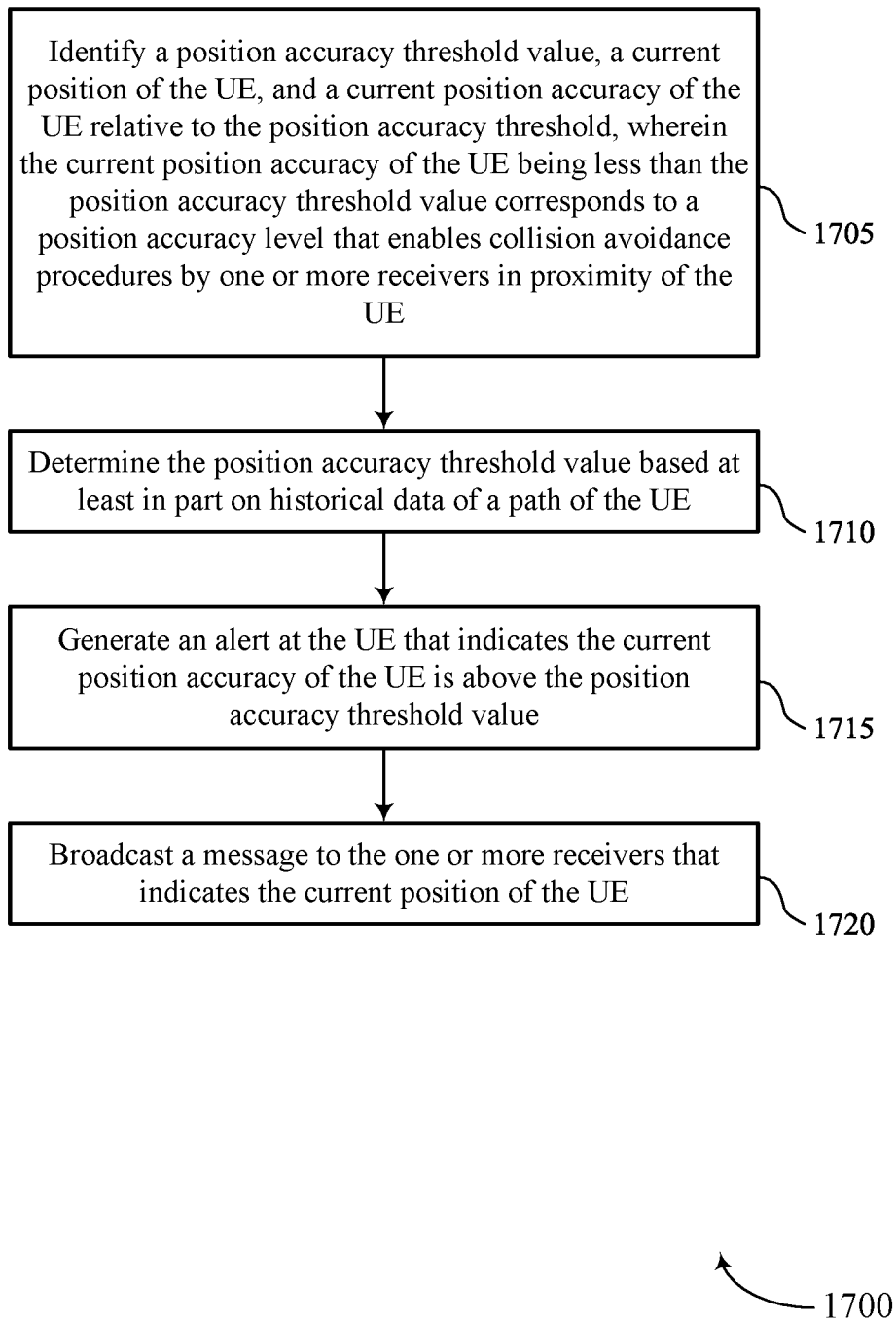

FIG. 17 shows a flowchart illustrating a method 1700 that supports roadside user alert techniques based on location accuracy in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include identifying a position accuracy threshold value, a current position of the UE, and a current position accuracy of the UE relative to the position accuracy threshold, where the current position accuracy of the UE being less than the position accuracy threshold value corresponds to a position accuracy level that enables collision avoidance procedures by one or more receivers in proximity of the UE. The operations of 1705 may be performed in accordance with examples as disclosed herein. In some examples, aspects of the operations of 1705 may be performed by a position accuracy manager 925 as described with reference to FIG. 9.

At 1710, the method may include determining the position accuracy threshold value based on historical data of a path of the UE. The operations of 1710 may be performed in accordance with examples as disclosed herein. In some examples, aspects of the operations of 1710 may be performed by a position prediction manager 940 as described with reference to FIG. 9.

At 1715, the method may include generating an alert at the UE that indicates the current position accuracy of the UE is above the position accuracy threshold value. The operations of 1715 may be performed in accordance with examples as disclosed herein. In some examples, aspects of the operations of 1715 may be performed by a positioning manager 930 as described with reference to FIG. 9.

At 1720, the method may include broadcasting a message to the one or more receivers that indicates the current position of the UE. The operations of 1720 may be performed in accordance with examples as disclosed herein. In some examples, aspects of the operations of 1720 may be performed by a safety message manager 935 as described with reference to FIG. 9.

Figure 18:
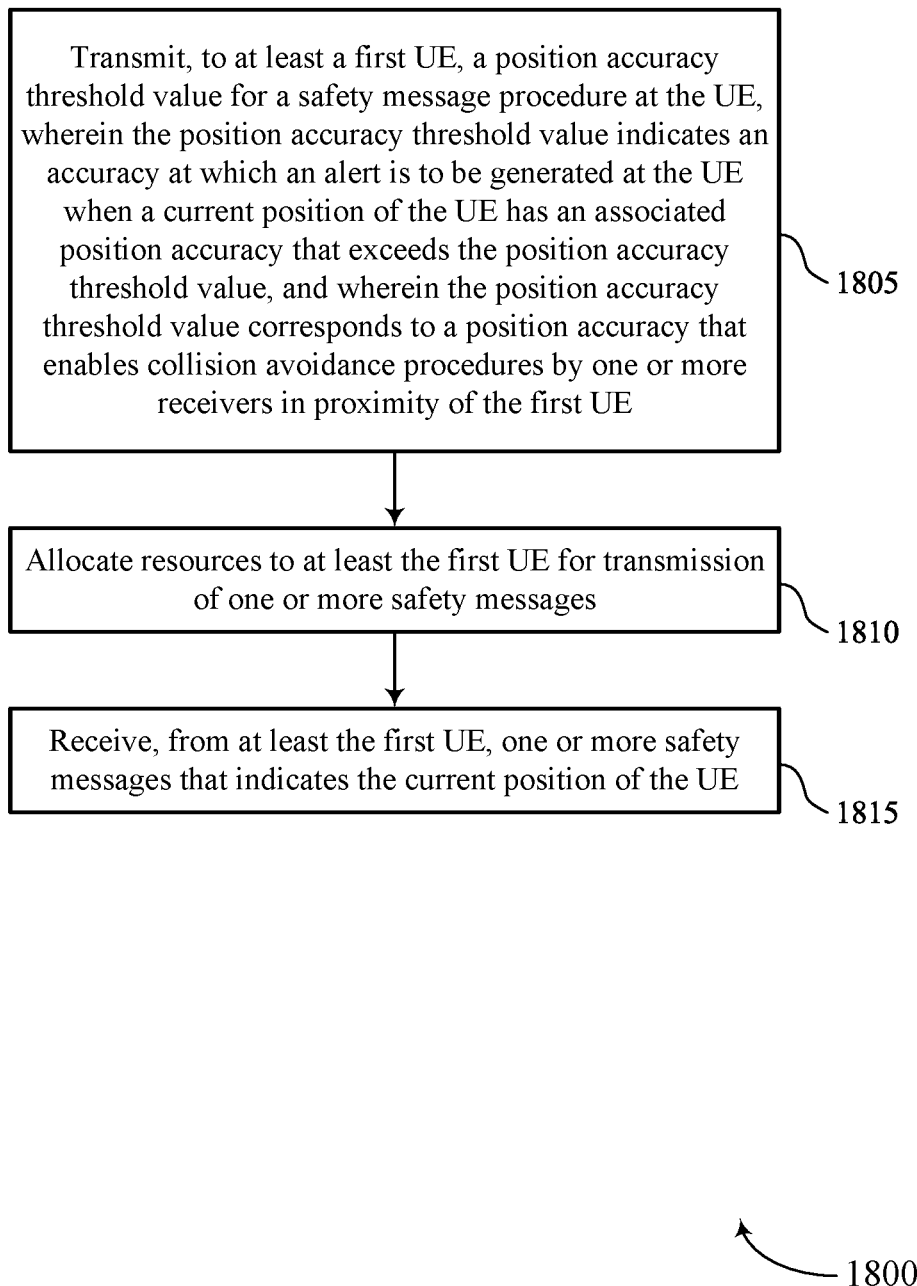

FIG. 18 shows a flowchart illustrating a method 1800 that supports roadside user alert techniques based on location accuracy in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to at least a first UE, a position accuracy threshold value for a safety message procedure at the UE, where the position accuracy threshold value indicates an accuracy at which an alert is to be generated at the UE when a current position of the UE has an associated position accuracy that exceeds the position accuracy threshold value, and where the position accuracy threshold value corresponds to a position accuracy that enables collision avoidance procedures by one or more receivers in proximity of the first UE. The operations of 1805 may be performed in accordance with examples as disclosed herein. In some examples, aspects of the operations of 1805 may be performed by a position accuracy manager 1325 as described with reference to FIG. 13.

At 1810, the method may include allocating resources to at least the first UE for transmission of one or more safety messages. The operations of 1810 may be performed in accordance with examples as disclosed herein. In some examples, aspects of the operations of 1810 may be performed by a resource allocation manager 1330 as described with reference to FIG. 13.

At 1815, the method may include receiving, from at least the first UE, one or more safety messages that indicates the current position of the UE. The operations of 1815 may be performed in accordance with examples as disclosed herein. In some examples, aspects of the operations of 1815 may be performed by a safety message manager 1335 as described with reference to FIG. 13.

The following provides an overview of aspects of the present disclosure:

Aspect 1: A method for wireless communication at a UE, comprising: identifying a position accuracy threshold value, a current position of the UE, and a current position accuracy of the UE relative to the position accuracy threshold, wherein the current position accuracy of the UE being less than the position accuracy threshold value corresponds to a position accuracy level that enables collision avoidance procedures by one or more receivers in proximity of the UE; generating an alert at the UE that indicates the current position accuracy of the UE is above the position accuracy threshold value; and broadcasting a message to the one or more receivers that indicates the current position of the UE.

Aspect 2: The method of aspect 1, further comprising: receiving, from a serving base station, the position accuracy threshold value via common signaling, dedicated signaling, or application layer signaling.

Aspect 3: The method of any of aspects 1 through 2, wherein the position accuracy threshold value is based at least in part on a preconfigured accuracy threshold determination at the UE.

Aspect 4: The method of any of aspects 1 through 3, wherein the identifying the position accuracy threshold value comprises: determining the position accuracy threshold value based at least in part on historical data of a path of the UE.

Aspect 5: The method of any of aspects 1 through 4, wherein the current position of the UE and the current position accuracy of the UE are based at least in part on signals received from one or more of a global navigation satellite system (GNSS), a terrestrial-based positioning system, one or more wireless network nodes, one or more sensors at the UE, or any combinations thereof.

Aspect 6: The method of any of aspects 1 through 5, wherein the broadcasting the message to one or more receivers comprises transmitting a safety message to the one or more receivers.

Aspect 7: The method of aspect 6, wherein the safety message includes one or more of a position of the UE, a speed of the UE, a heading of the UE, an acceleration of the UE, a path history of the UE, a path prediction of the UE, or any combinations thereof.

Aspect 8: The method of aspect 7, wherein the safety message further indicates the current position accuracy of the UE relative to the position accuracy threshold.

Aspect 9: The method of any of aspects 1 through 8, wherein the position accuracy threshold value is received at the UE in an information element as a latitude accuracy threshold value, a longitude accuracy threshold value, an altitude accuracy threshold value, and a temporal duration during which each of the threshold values are to be maintained.

Aspect 10: The method of any of aspects 1 through 8, wherein the position accuracy threshold value is received at the UE in an information element as one or more of a semi-major axis accuracy threshold value, semi-minor axis accuracy threshold value, a set of longitude/latitude/altitude (LLA) thresholds, a temporal duration during which each of the threshold values are to be maintained, or any combinations thereof.

Aspect 11: The method of any of aspects 1 through 10, wherein the position accuracy threshold value is received at the UE in a system information message that is transmitted by a base station or a roadside unit (RSU) in common signaling to multiple UEs or dedicated signaling to a single UE.

Aspect 12: The method of aspect 11, wherein the position accuracy threshold value is transmitted in a location positioning protocol (LPP) message from a base station or a different UE.

Aspect 13: A method for wireless communication at a base station, comprising: transmitting, to at least a first UE, a position accuracy threshold value for a safety message procedure at the UE, wherein the position accuracy threshold value indicates an accuracy at which an alert is to be generated at the UE when a current position of the UE has an associated position accuracy that exceeds the position accuracy threshold value, and wherein the position accuracy threshold value corresponds to a position accuracy that enables collision avoidance procedures by one or more receivers in proximity of the first UE; allocating resources to at least the first UE for transmission of one or more safety messages; and receiving, from at least the first UE, one or more safety messages that indicates the current position of the UE.

Aspect 14: The method of aspect 13, wherein the position accuracy threshold value is transmitted to at least the first UE via common signaling to a plurality of UEs, dedicated signaling to at least the first UE, or application layer signaling.

Aspect 15: The method of any of aspects 13 through 14, wherein the position accuracy threshold value is based at least in part on a preconfigured accuracy threshold determination.

Aspect 16: The method of any of aspects 13 through 15, wherein the position accuracy threshold value is based at least in part on historical data of a path of the UE.

Aspect 17: The method of any of aspects 13 through 16, wherein the one or more safety messages are broadcast by the first UE to one or more receivers.

Aspect 18: The method of aspect 17, wherein the one or more safety messages include one or more of a position of the first UE, a speed of the first UE, a heading of the first UE, an acceleration of the first UE, a path history of the first UE, a path prediction of the first UE, or any combinations thereof.

Aspect 19: The method of aspect 18, wherein the one or more safety messages further indicate a current position accuracy of the first UE relative to the position accuracy threshold value.

Aspect 20: The method of any of aspects 13 through 19, wherein the position accuracy threshold value is transmitted in an information element as a latitude accuracy threshold value, a longitude accuracy threshold value, an altitude accuracy threshold value, and a temporal duration during which each of the threshold values are to be maintained.

Aspect 21: The method of any of aspects 13 through 20, wherein the position accuracy threshold value is transmitted in an information element as one or more of a semi-major axis accuracy threshold value, semi-minor axis accuracy threshold value, a set of longitude/latitude/altitude (LLA) thresholds, a temporal duration during which each of the threshold values are to be maintained, or any combinations thereof.

Aspect 22: The method of any of aspects 13 through 21, wherein the position accuracy threshold value is transmitted in a system information message that is transmitted by the base station in common signaling to multiple UEs or dedicated signaling to at least the first UE.

Aspect 23: The method of aspect 22, wherein the position accuracy threshold value is transmitted in a location positioning protocol (LPP) message that is broadcast by the base station.

Aspect 24: An apparatus for wireless communication at a UE, comprising a processor; memory coupled with the processor; and instructions stored in the memory and executable by the processor to cause the apparatus to perform a method of any of aspects 1 through 12.

Aspect 25: An apparatus for wireless communication at a UE, comprising at least one means for performing a method of any of aspects 1 through 12.

Aspect 26: A non-transitory computer-readable medium storing code for wireless communication at a UE, the code comprising instructions executable by a processor to perform a method of any of aspects 1 through 12.

Aspect 27: An apparatus for wireless communication at a base station, comprising a processor; memory coupled with the processor; and instructions stored in the memory and executable by the processor to cause the apparatus to perform a method of any of aspects 13 through 23.

Aspect 28: An apparatus for wireless communication at a base station, comprising at least one means for performing a method of any of aspects 13 through 23.

Aspect 29: A non-transitory computer-readable medium storing code for wireless communication at a base station, the code comprising instructions executable by a processor to perform a method of any of aspects 13 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure.

Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication by a user equipment (UE), comprising:
   identifying a current position of the UE and a current position accuracy of the UE;
   determining, based at least in part on historical data associated with a path in proximity of the current position of the UE, a position accuracy threshold value, wherein the position accuracy threshold value corresponds to a position accuracy that is sufficient to enable collision avoidance procedures by one or more receivers in proximity of the UE;
   generating, based on determining that the current position accuracy of the UE is above the position accuracy threshold value, an alert that indicates that the current position accuracy of the UE is insufficient to enable collision avoidance procedures by the one or more receivers in proximity of the UE; and
   broadcasting a message to the one or more receivers that indicates the current position of the UE.

2. The method of claim 1, wherein determining the position accuracy threshold value is further based at least in part on applying one or more preconfigured parameters to the current position of the UE and the historical data associated with the UE.

3. The method of claim 1, wherein determining, based at least in part on the historical data associated with the path in proximity of the current position of the UE, the position accuracy threshold value comprises:
   determining the position accuracy threshold value based at least in part on historical incidences of collisions or near-misses with one or more vehicles on the path of the UE.

4. The method of claim 1, wherein the current position of the UE and the current position accuracy of the UE are based at least in part on signals received from one or more of a global navigation satellite system (GNSS), a terrestrial-based positioning system, one or more wireless network nodes, one or more sensors at the UE, or any combinations thereof.

5. The method of claim 1, wherein the broadcasting the message to the one or more receivers comprises transmitting a safety message to the one or more receivers.

6. The method of claim 5, wherein the safety message includes one or more of a position of the UE, a speed of the UE, a heading of the UE, an acceleration of the UE, a path history of the UE, a path prediction of the UE, or any combinations thereof.

7. The method of claim 5, wherein the safety message indicates the current position accuracy of the UE relative to the position accuracy threshold value.

8. The method of claim 1, further comprising:
   receiving, from a network entity, a temporal duration during which the position accuracy threshold value is to be maintained.

9. The method of claim 1, further comprising:
   generating the alert further based at least in part on determining that the current position accuracy of the UE is above the position accuracy threshold value for a predetermined duration of time.

10. The method of claim 1, wherein the message broadcast to the one or more receivers in proximity of the UE further indicates that the current position accuracy of the UE is insufficient to enable collision avoidance procedures by the one or more receivers.

11. The method of claim 1, further comprising:
causing, based at least in part on the current position accuracy of the UE being insufficient to enable collision avoidance procedures by the one or more receivers in proximity of the UE, execution of one or more defensive maneuvers by a vehicle associated with the UE.

12. A method for wireless communication at a network entity, comprising:
determining, based at least in part on historical data associated with a path in proximity of a current position of a first user equipment (UE), a position accuracy threshold value for a safety message procedure at the first UE, wherein the position accuracy threshold value corresponds to a position accuracy that is sufficient to enable collision avoidance procedures by one or more receivers in proximity of the first UE;
transmitting, to the first UE, the position accuracy threshold value;
allocating resources to the first UE for transmission of one or more safety messages; and
receiving, from the first UE, a safety message that indicates whether a current position accuracy of the first UE satisfies the position accuracy threshold value.

13. The method of claim 12, wherein the position accuracy threshold value is transmitted to the first UE via common signaling to a plurality of UEs including the first UE, dedicated signaling to the first UE, or application layer signaling.

14. The method of claim 12, wherein determining, based at least in part on the historical data associated with the path in proximity of the current position of the first UE, the position accuracy threshold value comprises:
determining the position accuracy threshold value based at least in part on historical incidences of collisions or near-misses with one or more vehicles on the path of the first UE.

15. The method of claim 12, wherein the safety message is broadcast to the one or more receivers.

16. The method of claim 12, wherein the safety message includes one or more of a position of the first UE, a speed of the first UE, a heading of the first UE, an acceleration of the first UE, a path history of the first UE, a path prediction of the first UE, or any combinations thereof.

17. The method of claim 12, wherein the safety message further indicates the current position accuracy of the first UE relative to the position accuracy threshold value.

18. The method of claim 12, wherein the position accuracy threshold value is transmitted in an information element as a latitude accuracy threshold value, a longitude accuracy threshold value, an altitude accuracy threshold value, and a temporal duration during which the position accuracy threshold value is to be maintained.

19. The method of claim 12, wherein the position accuracy threshold value is transmitted in an information element as one or more of a semi-major axis accuracy threshold value, semi-minor axis accuracy threshold value, a set of longitude/latitude/altitude (LLA) thresholds, a temporal duration during which the position accuracy threshold value is to be maintained, or any combinations thereof.

20. The method of claim 12, wherein the position accuracy threshold value is transmitted in a system information message via common signaling to a plurality of UEs including the first UE or dedicated signaling to the first UE.

21. The method of claim 12, wherein the position accuracy threshold value is transmitted in a location positioning protocol (LPP) message that is broadcast to a plurality of UEs.

22. The method of claim 12, further comprising:
performing, based at least in part on the safety message indicating that the current position accuracy of the first UE does not satisfy the position accuracy threshold value, one or more configuration updates.

23. The method of claim 12, further comprising:
transmitting, to a second UE and based at least in part on the safety message indicating that the current position accuracy of the first UE does not satisfy the position accuracy threshold value, information indicating that the current position accuracy of the first UE is insufficient to enable collision avoidance procedures by the one or more receivers in proximity of the first UE.

24. A user equipment (UE) for wireless communication, comprising:
one or more memories storing processor-executable code; and
one or more processors coupled with the one or more memories and individually or collectively operable to execute the code to cause the UE to:
identify a current position of the UE and a current position accuracy of the UE;
determine, based at least in part on historical data associated with a path in proximity of the current position of the UE, a position accuracy threshold value, wherein the position accuracy threshold value corresponds to a position accuracy that is sufficient to enable collision avoidance procedures by one or more receivers in proximity of the UE;
generate, based on a determination that the current position accuracy of the UE is above the position accuracy threshold value, an alert that indicates that the current position accuracy of the UE is insufficient to enable collision avoidance procedures by the one or more receivers in proximity of the UE; and
broadcast a message to the one or more receivers that indicates the current position of the UE.

25. The UE of claim 24, wherein, to determine the position accuracy threshold value, the one or more processors are individually or collectively operable to execute the code to cause the UE to apply one or more preconfigured parameters to the current position of the UE and the historical data associated with the UE.

26. The UE of claim 24, wherein the one or more processors are individually or collectively further operable to execute the code to cause the UE to:
generate the alert further based at least in part on a determination that the current position accuracy of the UE is above the position accuracy threshold value for a predetermined duration of time.

27. A network entity for wireless communication, comprising:
one or more memories storing processor-executable code; and
one or more processors coupled with the one or more memories and individually or collectively operable to execute the code to cause the network entity to:
determine, based at least in part on historical data associated with a path in proximity of a current position of a first user equipment (UE), a position accuracy threshold value for a safety message procedure at the first UE, wherein the position accuracy threshold value corresponds to a position accuracy that is sufficient to enable collision avoidance procedures by one or more receivers in proximity of the first UE;

transmit, to the first UE, the position accuracy threshold value;

allocate resources to the first UE for transmission of one or more safety messages; and receive, from the first UE, a safety message that indicates whether a current position accuracy of the first UE satisfies the position accuracy threshold value.

28. The network entity of claim 27, wherein the position accuracy threshold value is transmitted to the first UE via common signaling to a plurality of UEs including the first UE, dedicated signaling to the first UE, or application layer signaling.

29. The network entity of claim 27, wherein the one or more safety messages include one or more of a position of the first UE, a speed of the first UE, a heading of the first UE, an acceleration of the first UE, a path history of the first UE, a path prediction of the first UE, or any combinations thereof.

30. The network entity of claim 27, wherein, based at least in part on the safety message indicating that the current position accuracy of the first UE does not satisfy the position accuracy threshold value, the one or more processors are individually or collectively further operable to execute the code to cause the network entity to:

perform one or more configuration updates; or transmit, to a second UE, information indicating that the current position accuracy of the first UE is insufficient to enable collision avoidance procedures by the one or more receivers in proximity of the first UE.

* * * * *